US010253505B2

(12) United States Patent
Bilge

(10) Patent No.: US 10,253,505 B2
(45) Date of Patent: Apr. 9, 2019

(54) SYSTEM FOR MOUNTING WALL PANELS TO A WALL STRUCTURE AND WALL PANELS THEREFOR

(71) Applicant: Henry H. Bilge, Fort Lee, NJ (US)

(72) Inventor: Henry H. Bilge, Fort Lee, NJ (US)

(\*) Notice: Subject to any disclaimer, the term of this patent is extended or adjusted under 35 U.S.C. 154(b) by 0 days.

(21) Appl. No.: 14/641,097

(22) Filed: Mar. 6, 2015

(65) Prior Publication Data

US 2015/0176287 A1 Jun. 25, 2015

Related U.S. Application Data

(63) Continuation-in-part of application No. 14/256,384, filed on Apr. 18, 2014, now Pat. No. 9,562,361, (Continued)

(51) Int. Cl.
*E04F 19/06* (2006.01)
*E04F 13/08* (2006.01)
(Continued)

(52) U.S. Cl.
CPC .......... *E04F 13/0871* (2013.01); *E04C 2/292* (2013.01); *E04F 13/083* (2013.01);
(Continued)

(58) Field of Classification Search
CPC ............... E04F 19/062; E04F 2203/02; E04F 2290/026; E04F 13/083; E04F 13/0871;
(Continued)

(56) References Cited

U.S. PATENT DOCUMENTS

| 1,655,406 A | 1/1928 | Bennett |
| 1,726,500 A | 8/1929 | Norris |

(Continued)

FOREIGN PATENT DOCUMENTS

| DE | 3732534 A1 | 4/1989 |
| DE | 3732535 A1 | 4/1989 |

(Continued)

OTHER PUBLICATIONS

Machine Translation of Japanese Patent 2011-024543 (obtained from the Japanese Patent Office at https://dossier1.j-platpat.inpit.go.jp/tri/all/odse/ODSE_GM101_Top.action; last accessed Oct. 16, 2017).*

(Continued)

*Primary Examiner* — Charles A Fox
*Assistant Examiner* — Charissa Ahmad
(74) *Attorney, Agent, or Firm* — Richard M. Goldberg

(57) ABSTRACT

A system for mounting wall panels to a wall includes wall panels, each including a main wall panel section, and four bent end sections extending from edges of the main wall panel section; a plurality of main fastening extrusions, each including a base secured to the wall, two spaced apart post walls extending from the base section, and two bent end securing walls extending from the base on opposite sides of each post wall, with a spacing between each post wall and an adjacent bent end securing wall being equal to the wall thickness of one bent end section; and a recess at a first surface of each bent end section which faces a second surface of a respective bent end securing wall, and a projection at the second surface of each bent end securing wall which is adapted to be received in a respective recess.

7 Claims, 20 Drawing Sheets

Related U.S. Application Data which is a continuation-in-part of application No. 13/868,574, filed on Apr. 23, 2013, now Pat. No. 8,739,483, which is a continuation-in-part of application No. 13/747,035, filed on Jan. 22, 2013, now Pat. No. 8,833,015.

(51) Int. Cl.
    *E04C 2/292*     (2006.01)
    *E04F 13/12*     (2006.01)
    *F24S 20/66*     (2018.01)
    *E04F 19/04*     (2006.01)
    *F24S 25/60*     (2018.01)

(52) U.S. Cl.
    CPC ............ *E04F 13/12* (2013.01); *E04F 19/062* (2013.01); *E04F 19/065* (2013.01); *F24S 20/66* (2018.05); *E04F 2019/044* (2013.01); *E04F 2203/02* (2013.01); *E04F 2290/023* (2013.01); *E04F 2290/026* (2013.01); *F24S 2025/6004* (2018.05); *Y02B 10/20* (2013.01); *Y02E 10/44* (2013.01)

(58) Field of Classification Search
    CPC ..... E04F 19/065; E04F 19/02; E04F 13/0814; E04F 13/0889; E04F 13/0803; E04F 13/0826; F24J 2002/4665; E04B 9/26
    See application file for complete search history.

(56) References Cited

U.S. PATENT DOCUMENTS

| | | | |
|---|---|---|---|
| 1,833,174 A | 11/1931 | Norris | |
| 1,940,968 A * | 12/1933 | Ohlis | E04C 2/54 52/217 |
| 2,059,483 A | 11/1936 | Parsons | |
| 2,066,205 A | 12/1936 | Keating | |
| 2,073,278 A * | 3/1937 | Hohl | E04F 19/06 16/16 |
| 2,082,241 A | 6/1937 | Bennett | |
| 2,513,711 A * | 7/1950 | Cain | E04C 1/395 405/284 |
| 2,607,971 A | 8/1952 | Bedford | |
| 2,789,321 A | 4/1957 | Adams | |
| 2,796,636 A * | 6/1957 | Heerwagen | E04B 1/8409 181/284 |
| 2,803,321 A | 8/1957 | Fox-Williams | |
| 3,021,915 A | 2/1962 | Kemp | |
| 3,030,735 A * | 4/1962 | Bodkins | A47B 57/56 362/154 |
| 3,216,538 A | 11/1965 | Miller | |
| 3,263,388 A * | 8/1966 | Bogert | E04B 9/064 248/327 |
| 3,521,419 A * | 7/1970 | Fornells | E04B 9/26 52/386 |
| 3,530,633 A | 9/1970 | Scott | |
| 3,583,522 A * | 6/1971 | Rohweder | E04B 1/8409 181/290 |
| 3,605,368 A * | 9/1971 | Lalouche | E04B 9/245 52/460 |
| 3,665,666 A * | 5/1972 | Delcroix | E04B 2/967 52/461 |
| 3,671,061 A | 6/1972 | Dawdy | |
| 3,688,460 A * | 9/1972 | Van Loghem | E04F 19/065 277/641 |
| 3,858,377 A | 1/1975 | Browne et al. | |
| 3,861,102 A * | 1/1975 | Hodge | E04B 1/20 52/236.3 |
| 3,868,802 A * | 3/1975 | Schubach | E04B 2/58 29/450 |
| 3,994,471 A | 11/1976 | Turolla | |
| 4,001,974 A | 1/1977 | Wright | |
| 4,067,155 A * | 1/1978 | Ruff | E04B 1/6803 4/498 |
| 4,184,297 A | 1/1980 | Casamayor | |
| 4,300,323 A * | 11/1981 | Meechan | F16B 5/0072 52/461 |
| 4,332,119 A | 6/1982 | Toews | |
| 4,344,267 A | 8/1982 | Sukolics | |
| 4,385,850 A * | 5/1983 | Bobath | F16B 5/0068 403/205 |
| 4,393,631 A * | 7/1983 | Krent | E04B 1/86 181/286 |
| 4,452,020 A | 6/1984 | Werner | |
| 4,452,029 A | 6/1984 | Sukolics | |
| 4,557,091 A | 12/1985 | Auer | |
| 4,573,300 A | 3/1986 | Bezner | |
| 4,640,064 A | 2/1987 | Goodworth, II | |
| 4,667,579 A | 5/1987 | Daw | |
| 4,681,481 A * | 7/1987 | Kapusta | A63H 33/04 404/34 |
| RE32,509 E | 9/1987 | Werner | |
| 4,696,142 A | 9/1987 | Meiyal et al. | |
| 4,703,603 A | 11/1987 | Hills | |
| 4,736,563 A * | 4/1988 | Bilhorn | A01G 9/14 47/17 |
| 4,777,774 A | 10/1988 | Smalley, III | |
| 4,829,740 A | 5/1989 | Hutchison | |
| 4,833,839 A | 5/1989 | Kurose | |
| 4,833,858 A | 5/1989 | Hutchison | |
| 4,936,065 A * | 6/1990 | Hutchinson | E04B 2/96 52/235 |
| 4,965,976 A * | 10/1990 | Riddle | E04B 1/6803 52/396.05 |
| 5,005,315 A | 4/1991 | Jackson, Jr. | |
| 5,067,286 A * | 11/1991 | Richer | A47G 7/044 47/67 |
| 5,076,035 A * | 12/1991 | Wright | E04B 2/96 52/464 |
| 5,155,952 A * | 10/1992 | Herwegh | E04B 1/6803 52/100 |
| 5,226,755 A | 7/1993 | Tweedt | |
| 5,263,292 A | 11/1993 | Holland et al. | |
| 5,309,686 A * | 5/1994 | Underwood | A47B 83/001 160/135 |
| 5,353,571 A * | 10/1994 | Berdan | B60R 13/04 24/293 |
| 5,365,713 A * | 11/1994 | Nicholas | E04B 1/681 52/396.03 |
| 5,426,899 A | 6/1995 | Jones | |
| D364,692 S * | 11/1995 | Tinen | D25/138 |
| D364,932 S * | 12/1995 | Tinen | D25/138 |
| D365,159 S * | 12/1995 | Tinen | D25/138 |
| 5,579,624 A | 12/1996 | Aeberhard | |
| 5,611,185 A * | 3/1997 | Wilz | E04B 9/001 52/395 |
| 5,644,878 A | 7/1997 | Wehrmann | |
| 5,809,729 A | 9/1998 | Mitchell | |
| 5,993,321 A * | 11/1999 | Recknagel | E04F 19/02 473/113 |
| 5,996,301 A | 12/1999 | Conterno | |
| 6,101,777 A | 8/2000 | Bodine et al. | |
| 6,117,514 A * | 9/2000 | Herrmann | E04B 9/0428 428/177 |
| 6,164,024 A | 12/2000 | Konstantin | |
| 6,170,212 B1 * | 1/2001 | Suchyna | E01C 5/20 52/177 |
| 6,205,733 B1 | 3/2001 | LaLonde | |
| 6,253,489 B1 * | 7/2001 | Sung | A01G 9/02 362/122 |
| 6,289,645 B1 | 9/2001 | Schmid | |
| 6,330,772 B1 | 12/2001 | Mitchell et al. | |
| 6,430,885 B1 | 8/2002 | Ito | |
| 6,525,270 B1 | 2/2003 | Connor et al. | |
| 6,536,175 B2 | 3/2003 | Conterno | |
| D474,550 S * | 5/2003 | Wendt | D25/138 |
| 6,647,680 B2 * | 11/2003 | Daly | E04F 19/066 52/287.1 |
| 6,745,527 B1 | 6/2004 | Sherman et al. | |

(56) References Cited

U.S. PATENT DOCUMENTS

| | | |
|---|---|---|
| 6,751,916 B1 | 6/2004 | Ritzer et al. |
| 6,892,500 B2 | 5/2005 | Zabrowski |
| D512,787 S * | 12/2005 | Lonneman .................. D25/138 |
| 7,210,273 B2 | 5/2007 | Zahner, III |
| D575,416 S * | 8/2008 | LaBrash ...................... D25/138 |
| 7,472,521 B2 | 1/2009 | Bilge |
| 7,562,504 B2 * | 7/2009 | Herbst ................ E04F 13/0889 |
| | | 52/235 |
| 7,621,084 B2 | 11/2009 | Bilge |
| 7,627,983 B1 * | 12/2009 | Deutsch-Aboulmahassine .......... |
| | | A01G 9/025 |
| | | 47/65.5 |
| 7,752,818 B1 | 7/2010 | Roegge et al. |
| 7,802,408 B2 | 9/2010 | Asbury |
| 7,818,919 B1 * | 10/2010 | Maxwell-Merrill ... A01G 9/025 |
| | | 47/83 |
| 7,895,802 B2 * | 3/2011 | Kurz ................ E04F 15/02005 |
| | | 52/395 |
| 8,127,507 B1 | 3/2012 | Bilge |
| 8,136,321 B1 * | 3/2012 | Bauman ............... E04B 9/0464 |
| | | 52/462 |
| 8,166,716 B2 | 5/2012 | Macdonald et al. |
| 8,225,572 B2 | 7/2012 | Wallace |
| 8,256,181 B2 | 9/2012 | Voegele, Jr. et al. |
| 8,266,863 B2 | 9/2012 | Knauseder |
| 8,281,517 B2 * | 10/2012 | MacKenzie ........... A01G 9/025 |
| | | 47/82 |
| 8,307,607 B2 | 11/2012 | Conterno |
| 8,316,609 B2 | 11/2012 | Ben-Zvi |
| 8,347,569 B1 | 1/2013 | McIntyre et al. |
| D684,707 S * | 6/2013 | Yonash ........................ D25/138 |
| 8,640,402 B1 | 2/2014 | Bilge |
| 8,683,761 B2 * | 4/2014 | Danning ................ H02S 20/23 |
| | | 136/251 |
| 8,739,483 B1 | 6/2014 | Bilge |
| 8,793,941 B2 * | 8/2014 | Bosler .................. E04D 3/3605 |
| | | 52/173.3 |
| 8,833,015 B2 | 9/2014 | Bilge |
| 8,925,271 B1 | 1/2015 | Bilge |
| 8,950,112 B2 * | 2/2015 | dos Santos ............ A01G 9/025 |
| | | 47/82 |
| 8,966,849 B1 | 3/2015 | Bilge |
| 9,175,473 B2 * | 11/2015 | Kaump ................ E04B 9/0464 |
| 9,227,764 B2 * | 1/2016 | Martino .................. G08B 13/20 |
| 9,351,448 B2 * | 5/2016 | Mackenzie ............ A01G 9/025 |
| 9,631,372 B1 * | 4/2017 | Bilge ..................... E04F 13/072 |
| 2001/0022058 A1 | 9/2001 | Conterno |
| 2002/0035811 A1 | 3/2002 | Heuel |
| 2002/0152704 A1 | 10/2002 | Thompson et al. |
| 2002/0178684 A1 * | 12/2002 | Barnett ................ A47B 95/043 |
| | | 52/716.1 |
| 2003/0121227 A1 * | 7/2003 | Wendt ................ E04B 9/0478 |
| | | 52/506.07 |
| 2004/0134143 A1 | 7/2004 | Boyer |
| 2005/0060950 A1 * | 3/2005 | Hauschildt .......... E04F 13/0814 |
| | | 52/235 |
| 2009/0049770 A1 | 2/2009 | Konstantin |
| 2009/0241444 A1 | 10/2009 | Griffiths |
| 2009/0241451 A1 | 10/2009 | Griffiths |
| 2010/0083599 A1 * | 4/2010 | Meulemans .......... E04F 19/061 |
| | | 52/287.1 |
| 2010/0109567 A1 * | 5/2010 | Deurenberg ............ E04F 13/08 |
| | | 315/294 |
| 2010/0130094 A1 | 5/2010 | Michalk et al. |
| 2010/0220469 A1 * | 9/2010 | Ivey .......................... F21K 9/17 |
| | | 362/218 |
| 2012/0110938 A1 * | 5/2012 | DesJardins, Jr. ........ E04F 19/02 |
| | | 52/309.1 |
| 2012/0273633 A1 * | 11/2012 | Henriott ............... A47B 96/067 |
| | | 248/205.1 |
| 2014/0202112 A1 | 7/2014 | Bilge |
| 2014/0202113 A1 | 7/2014 | Bilge |
| 2014/0223850 A1 | 8/2014 | Bilge |
| 2015/0288320 A1 * | 10/2015 | Stearns ................... H02S 20/23 |
| | | 52/173.3 |
| 2016/0083964 A1 * | 3/2016 | Martino ............. B65D 73/0014 |
| | | 52/489.1 |

FOREIGN PATENT DOCUMENTS

| | | | |
|---|---|---|---|
| EP | 2166169 A1 | | 3/2010 |
| FR | 3000872 A1 | * | 7/2014 |
| GB | 2135355 A | | 8/1984 |
| JP | 8-189176 A | | 7/1997 |
| JP | 2011024543 A | * | 2/2011 |
| JP | 2012205529 A | * | 10/2012 |

OTHER PUBLICATIONS

Bamco Inc., G500 Wall System.

* cited by examiner

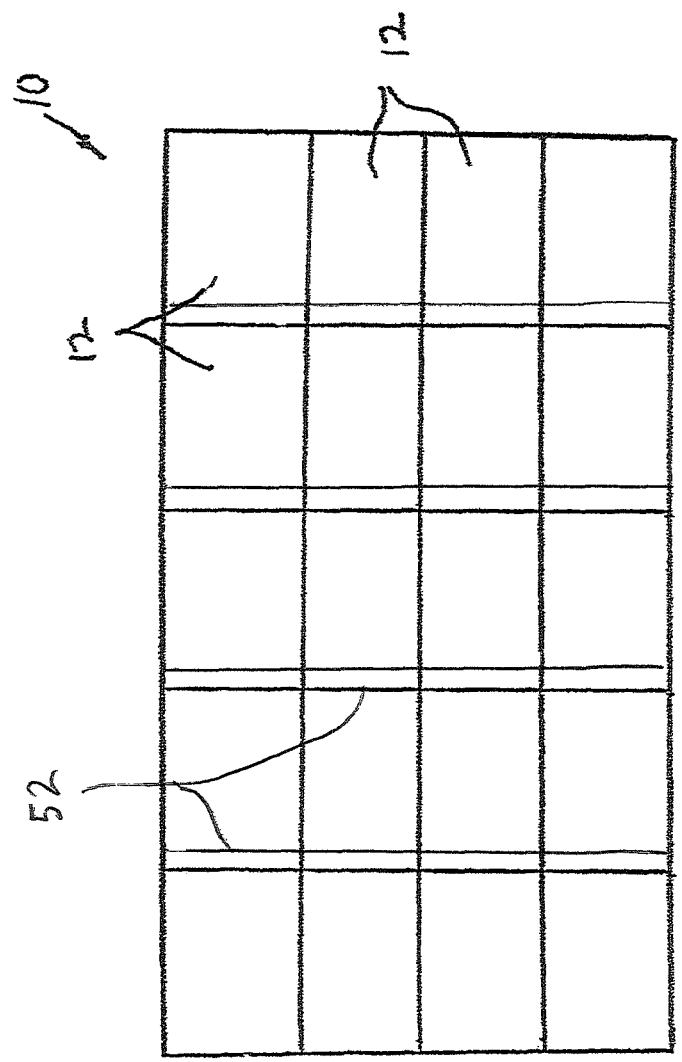

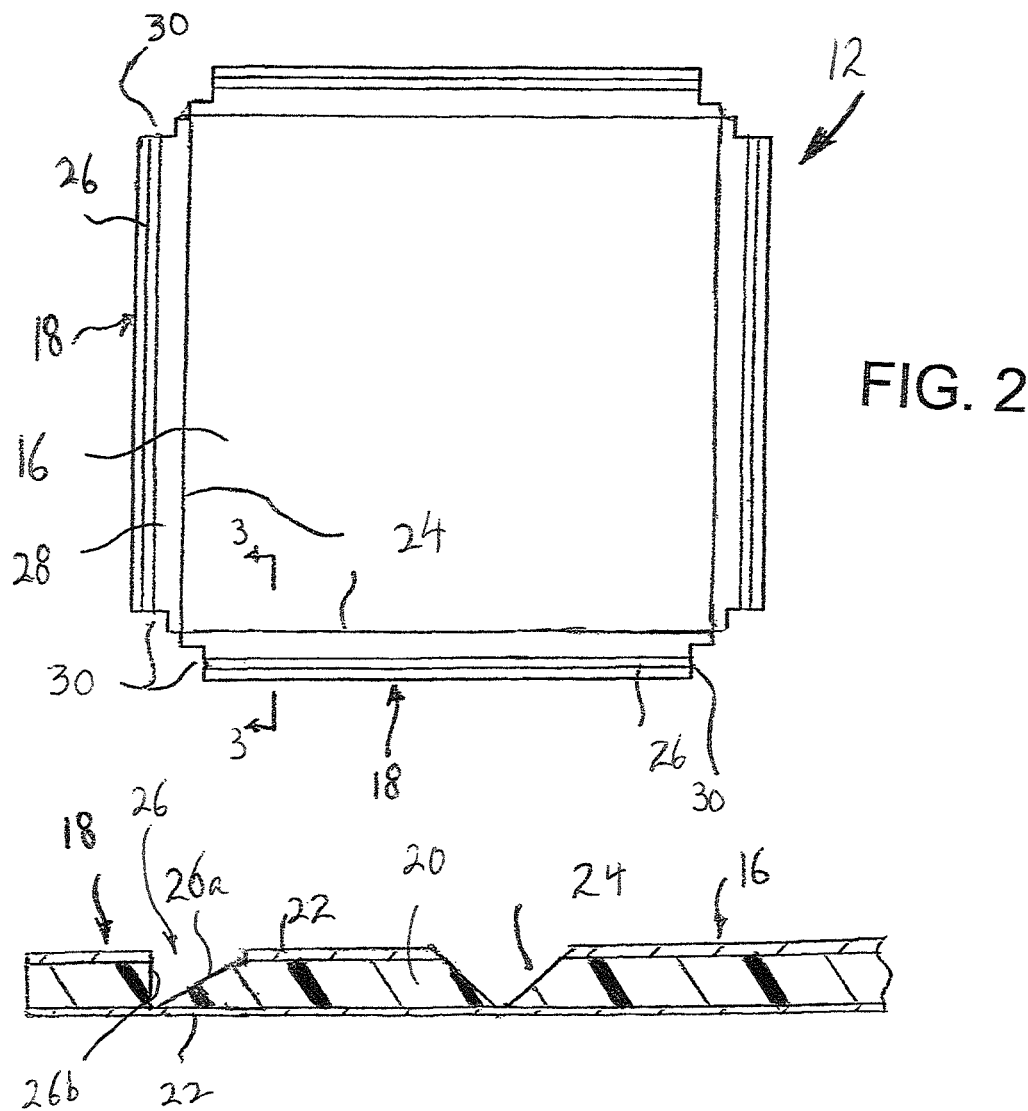

SYSTEM FOR MOUNTING WALL PANELS TO A WALL STRUCTURE AND WALL PANELS THEREFOR

REFERENCE TO RELATED APPLICATION

The present invention is a Continuation-In-Part of U.S. patent application Ser. No. 14/256,384, filed Apr. 18, 2014, which is a Continuation-In-Part of U.S. patent application Ser. No. 13/868,574 filed Apr. 23, 2013, which in turn, is a Continuation-In-Part of U.S. patent application Ser. No. 13/747,035 filed Jan. 22, 2013.

BACKGROUND OF THE INVENTION

The present invention relates generally to a wall system, and more particularly, to a system for easily mounting wall panels over an existing wall structure.

In order to enhance the look of a wall structure, it is known to secure decorative wall panels to the wall structure. However, the securement of wall panels to the wall structure is generally a long and tedious job since it entails using fastening devices such as nails and/or screws to secure the walls panels directly to the wall structure. In addition, the fastening devices are exposed, which can provide an unsightly appearance.

A system that overcomes these problems is disclosed in U.S. Pat. Nos. 8,739,483, 8,925,271 and 8,966,849 to the same inventor herein, the entire disclosures of which are incorporated herein by reference. In these patents, there is disclosed two spaced apart wall panels that snap into place such that adjacent bent end sections of adjacent wall panels are secured with a spacing therebetween to a common extrusion that is secured to an existing wall. In order to cover the gap between the adjacent wall panels, a plug or other element can be inserted between the wall panels to provide an aesthetic appearance and can be sealed therein as well.

However, the plug or other element inserted between the wall panels, according to the above patents, is limited in its construction and appearance, may provide a complicated construction for securement and/or does not always provide a positive securement in the gap.

SUMMARY OF THE INVENTION

Accordingly, it is an object of the present invention to provide a wall system that overcomes the aforementioned problems.

It is another object of the present invention to provide a wall system in which both the primary wall panels and the secondary plug wall panels are snapped into position into the extrusion.

It is another object of the present invention to provide a wall system in which the secondary plug wall panels are snapped into position into the extrusion between adjacent primary wall panels.

It is still another object of the present invention to provide a wall system in which the secondary plug wall panels can present any of numerous different aesthetic appearances, and be of any size and shape.

It is yet another object of the present invention to provide a wall system in which the wall panels are easy to assemble with an existing wall structure, and can have a removability feature in order to remove and replace the wall panels.

It is a further object of the present invention to provide a wall system that is easy and economical to manufacture and use.

In accordance with an aspect of the present invention, a system for mounting wall panels to an existing wall structure, includes a plurality of wall panels, each wall panel including a main wall panel section, and at least two bent end sections extending at an angle from different edges of the main wall panel section, each bent end section having a wall thickness. There are a plurality of main fastening extrusions. Each main fastening extrusion includes a base section adapted to be secured to the existing wall structure, and first and second spaced apart post walls extending at an angle from the base section. Each main fastening extrusion further includes a first bent end securing wall extending at an angle from the base section to an outside of the first post wall, with a spacing between the first post wall and the first bent end securing wall being equal to the wall thickness of one bent end section; a second bent end securing wall extending at an angle from the base section to an inside of the first post wall, with a spacing between the first post wall and the second bent end securing wall being equal to the wall thickness of one bent end section; a third bent end securing wall extending at an angle from the base section to an outside of the second post wall, with a spacing between the second post wall and the third bent end securing wall being equal to the wall thickness of one bent end section; and a fourth bent end securing wall extending at an angle from the base section to an inside of the second post wall, with a spacing between the second post wall and the fourth bent end securing wall being equal to the wall thickness of one bent end section. There is also either a) a recess at a first surface of each bent end section which faces a second surface of a respective bent end securing wall, and a projection at the second surface of each bent end securing wall which is adapted to be received in a respective recess; or b) a recess at the second surface of each bent end securing wall, and a projection at the first surface of each bent end section which is adapted to be received in a respective recess at the second surface.

Each projection has a cross-sectional shape selected from the following shapes of a square shape, a rectangular shape, a triangular shape, a triangular shape with a rounded upper surface, a trapezoidal shape, and a cylindrical shape.

Preferably, each recess is formed in the first surface of each bent end section, and each projection is formed at the second surface of each bent end securing wall.

The base section of each main fastening extrusion includes at least one wing section extending to an outside of at least one of the first and third bent end securing walls, and the at least one wing section includes openings therealong for receiving fastening devices to secure the main fastening extrusion to the wall structure.

The plurality of wall panels include primary wall panels of first dimensions adapted to be assembled with the first and third bent end securing walls, and secondary plug wall panels of second dimensions much less than the first dimensions for covering gaps between adjacent ones of the primary wall panels, and adapted to be assembled with said second and fourth bent end securing walls. Preferably, the main panel sections of the secondary plug wall panels form a three-dimensional relief relative to the main panel sections of the primary wall panels. Thus, the main panel sections of the secondary plug wall panels have a shape selected from the following shapes: a trapezoidal shape in cross-section; a rectangular shape in cross-section; a mushroom shape in cross-section; a shape in cross-section defined by outwardly inclined surfaces that meet at a central, upper concave surface; a roof like shape in cross-section; a shape in cross-section defined by outwardly inclined surfaces that meet at a central, wave-like surface; a pyramid shape; and trapezoidal side walls connected at shorter sides of each trapezoidal side wall to a rectangular center section.

At least one opening is provided in the main panel section of the secondary plug wall panel. In such case, at least one light source can be positioned below the main panel section of the secondary plug wall panel. Further, at least one of the following can be positioned below the main panel section of the secondary plug wall panel: electrical systems, pipes for carrying gases, pipes for carrying liquids, solar panel pipes, and a heat exchanger system. Also, a planter box can be positioned below the main panel section of the secondary plug wall panel, for holding flowers and plants.

Each bent end securing wall is resilient relative to the base section to permit the bent end securing wall to move away from the adjacent post wall when a bent end section is pressed therebetween, and to spring back to an original position when the respective projection is received in the respective recess.

In accordance with still another aspect of the present invention, a wall panel adapted to engage with a bent end securing wall of an extrusion that is secured to an existing wall structure, in order to mount the wall panel in covering relation to the existing wall structure, includes a main wall panel section, the main wall panel section presenting a three-dimensional shape in cross-section; and at least two bent end sections extending at an angle from different edges of the main wall panel section. There is either: a) a recess at a first surface of each bent end section which is adapted to face a second surface of a respective the bent end securing wall for engagement with a projection at the second surface of the respective bent end securing wall; or b) a projection at the first surface of each bent end section which for engagement with a recess at the second surface of the respective bent end securing wall.

Each projection and corresponding recess preferably has a cross-sectional shape selected from the following shapes: a square shape, a rectangular shape, a triangular shape, a triangular shape with a rounded upper surface, a trapezoidal shape, and a cylindrical shape.

Preferably, each recess is formed in the first surface of each bent end section, and each projection is formed at the second surface of each bent end securing wall.

The main wall panel sections can have a shape selected from the following shapes: a trapezoidal shape in cross-section; a rectangular in cross-section; a mushroom shape in cress-section; a shape in cross-section defined by outwardly inclined surfaces that meet at a central, upper concave surface; a roof like shape in cross-section; a shape in cross-section defined by outwardly inclined surfaces that meet at a central, wave-like surface; a pyramid shape; and trapezoidal side walls connected at shorter sides of each trapezoidal side wall to a rectangular center section.

In addition, at least one opening can be provided in the main wall panel section.

The above and other features of the invention will become readily apparent from the following detailed description thereof which is to be read in connection with the accompanying drawings.

BRIEF DESCRIPTION OF THE DRAWINGS

FIG. 1 is an elevational view of a plurality of wall panels mounted to an existing wall structure;

FIG. 2 is a bottom plan view of a blank for forming the wall panel of FIG. 2;

FIG. 3 is a cross-sectional view of the blank of FIG. 3, taken along line 3-3 thereof;

DETAILED DESCRIPTION

Figure 4:
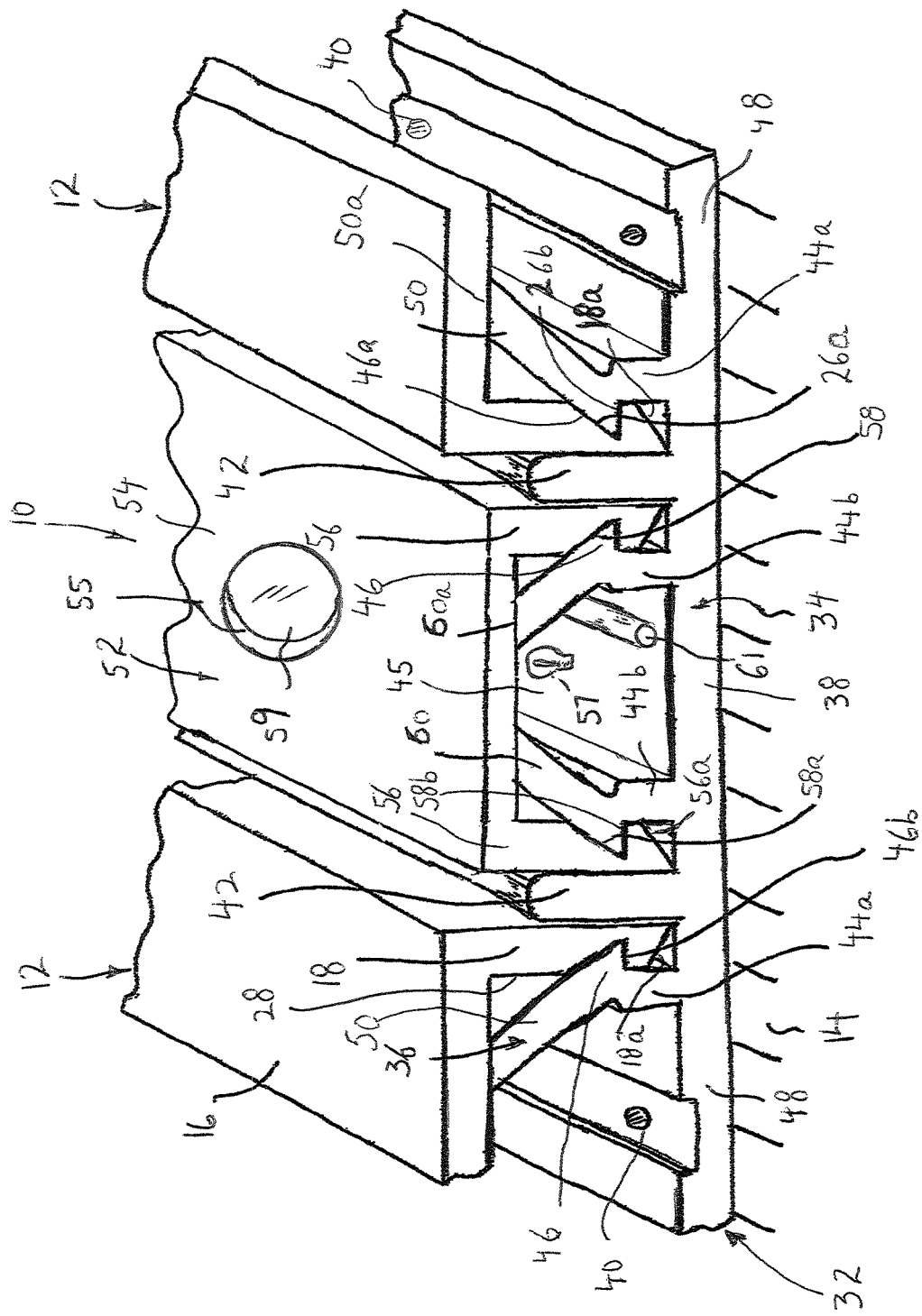
FIG. 4 is a perspective view of a system for mounting primary wall panels and secondary plug wall panels over an existing wall structure according to the present invention.

Referring to the drawings in detail, and initially to FIGS. 1-4 thereof, there is shown a system 10 according to the present invention for easily mounting primary wall panels 12 over an existing wall structure 14. Wall structure 14 preferably includes any planar wall. Each primary wall panel 12 includes a rectangular shaped, planar main panel section 16 and at least two bent end sections 18 bent at a right angle in the same direction at edges of main panel section 16. Main panel section 16, however, need not be planar, and in fact, can have different shapes, such as a wave shape, etc. to provide different aesthetic appearances. Preferably, there are four bent end sections 18 at each edge of main panel section 16 which form an L-shaped cross sectional shape thereat. However, the invention is not limited thereby and primary wall panels 12 can be formed with two, three or four bent end sections 18. Primary wall panels 12 are formed preferably by, but not limited to, a polyethylene core 20 with a thin aluminum wall 22 covering opposite sides thereof, as shown in FIG. 3. However, for the sake of simplicity in the drawings, all of the drawings except for FIG. 3 show primary wall panels 12 formed of only a single material.

As shown in FIGS. 2 and 3, each primary wall panel 12 is preferably formed from a planar blank, which can be stamped from or cut from a larger sheet of the respective material. Specifically, each planar blank is formed by planar main panel section 16 which is preferably, but not limited to, a square shape with all sides being equal. There are four bent end sections 18, each formed as one unitary piece at a respective side edge of planar main panel section 16, and coplanar therewith. A V-shaped cut-out 24 extends through one thin aluminum wall 22 and polyethylene core 20 at the connecting edge of each bend end section 18 to the side edge of planar main panel section 16, as best shown in FIG. 3. This permits each bent end section 18 to be bent along its respective V-shaped cut-out 24 at a right angle to planar main panel section 16 in the manner shown, for example, in FIG. 4. Each bent end section 18 further includes a cut-out recess 26 extending the length of the inner surface 28 thereof and spaced slightly away from main panel section 16. Each cut-out recess 26 preferably has an acute angle, nose-shaped configuration in cross-section, as shown in FIGS. 3 and 4, although the present invention is not limited thereby. As a result, cut-out recess 26 effectively forms a notch in the inner surface 28 of bent end section 18. Thus, each cut-out recess 26 has an inclined surface 26a that extends toward the distal end of the bent end section 18 at the inner surface 28 thereof, and terminates at a holding surface 26b that extends parallel to main panel section 16. Cut-out recess 26 preferably extends along the entire length of the bent end section 18, although the present invention is not so limited, that is, cut-out recess 26 can extend along only a part of the length of bent end section 18, or there may be a plurality of spaced apart cut-out recesses 26.

Further, each bent end section 18 has a lower beveled end 18a.

In addition, preferably, although not required by the present invention, the opposite ends of each bent end section 18 have a rectangular cut-away section 30, as shown in FIG. 2, so that when bent end sections 18 are bent at right angles to main panel section 16, corner openings or cut-away sections are provided. With this arrangement, when primary walls panels 12 are secured to elongated main fastening extrusions that are secured to existing wall structure 14, primary wall panels 12 can merely be hung thereon and slid therealong, as a result of the corner openings.

As shown in FIG. 4, main fastening extrusions 32 are provided for securing each primary wall panel 12 to existing wall structure 14. Each main fastening extrusion 32 is preferably formed as a single, one-piece, unitary member that includes a base section 34 secured to existing wall structure 14 and a supporting section 36 to which a bent end section 18 of each primary wall panel 12 is secured. As with each primary wall panel 12, each main fastening extrusion 32 is formed preferably by, but not limited to, a polyethylene core 20 with a thin aluminum wall 22 covering opposite sides thereof. Alternatively, each main fastening extrusion 32 can be formed from polyvinyl chloride (PVC), aluminum or any other suitable material. It will be appreciated that base section 34 can be formed from a plurality of pieces instead.

Base section 34 includes a central planar wall 38 that seats flush against existing wall structure 14, and which has a plurality of linearly aligned openings 40 extending therealong and through which screws (not shown) can be inserted to secure central planar wall 38 to existing wall structure 14.

Supporting section 36 includes two, parallel, spaced apart, elongated post walls 42 extending outwardly at right angles from central planar wall 38 and extending the length of each main fastening extrusion 32. A first bent end securing wall 44a extends outwardly at right angles from central planar wall 38 on an outer side of each post wall 42, with the spacing between each post wall 42 and each adjacent bent end securing wall 44a being equal to the thickness of one bent end section 18, and a second bent end securing wall 44b extends outwardly at right angles from central planar wall 38 on an inner side of each post wall 42, with the spacing between each post wall 42 and each adjacent bent end securing wall 44b being equal to the thickness of one bent end section 18. A spacing 45 is provided between adjacent bent end securing walls 44b.

Each bent end securing wall 44a and 44b includes a projection 46 at the surface thereof in facing relation to the adjacent post wall 42, with each projection 46 having a nose-shaped configuration in cross-section, which corresponds in shape and dimensions to nose-shaped cut-out recess 26, although the present invention is not limited thereby. Specifically, each projection 46 has an inclined surface 46a that slopes in a direction toward base section 34 and terminates at a holding surface 46b that extends parallel to central planar wall 38. Projection 46 preferably extends along the entire length of the respective bent end securing wall 44a or 44b, although the present invention is not so limited, that is, projection 46 can extend along only a part of the length of the respective bent end securing wall 44a or 44b, or there may be a plurality of spaced apart projections 46.

The inclined surface 46a of each inwardly directed projection 46 continues upwardly at an angle with an inclined wall 50, the free end 50a of which is intended to abut against the undersurface of main wall panel section 16 when inwardly directed projection 46 is positioned in cut out recess 26 so as to provide a snap-tight like action with a tight fit so that there is little or no play, whereby primary wall panels 12 are tightly held in position. However, inclined walls 50 are not a requirement of the present invention, and can be eliminated.

To assemble primary wall panels 12 with main fastening extrusions 32, it is only necessary to press bent end sections 18 into the space between a post wall 42 and an adjacent bent end securing wall 44a, whereby the bent end securing wall 44a is biased away from the post wall 42, until holding surface 26b passes by holding surface 46b, whereupon bent end securing wall 44a springs back to its original position due to its resilience, whereby nose-shaped inwardly directed projection 46 engages in nose-shaped cut out recess 26. This is due to the resilient nature of bent end securing walls 44a, 44b. In such case, holding surface 46b engages holding surface 26b to prevent escape of bent end section 18. In such position, free end 50a of inclined wall 50 is in abutting or near abutting relation with the underside of the respective planar main panel section 16.

In accordance with the present invention, a secondary plug wall panel 52 is also snapped into position into extrusion 32 in covering relation to the space 45 between adjacent primary wall panels 12. In its simplest form, each secondary plug wall panel 52 is formed in the same manner as each wall panel 12, but is of much smaller dimensions, as shown best in FIG. 1. Thus, each secondary plug wall panel 52 includes a rectangular shaped, planar main plug panel section 54 and at least two bent end sections 56 bent at a right angle in the same direction at edges of main plug panel section 54. Main plug panel section 54, however, need not be planar, and in fact, can have different shapes, such as a wave shape, etc. to provide different aesthetic appearances. Preferably, there are four bent end sections 56 at each edge of main plug panel section 54 which form an L-shaped cross-sectional shape thereat. However, the invention is not limited thereby and secondary plug wall panel 52 can be formed with two, three or four bent end sections 56. Each secondary plug wall panel 52 is formed preferably by, but not limited to, a polyethylene core 20 with a thin aluminum wall 22 covering opposite sides thereof, of the type shown in FIG. 3. However, for the sake of simplicity in the drawings, all of the drawings show secondary plug wall panels formed of only a single material. Thus, as with wall panels 12, each secondary plug wall panel 52 includes a cut-out recess 58 extending the length of the inner surface of each bent end section 56, and spaced slightly away from main plug panel section 54. Each cut-out recess 58 has an acute angle, nose-shaped configuration in cross-section, as shown in FIG. 4, that effectively forms a notch in the inner surface of bent end section 56. Thus, each cut-out recess 58 has an inclined surface 58a that extends toward the distal end of the bent end section 56 at the inner surface thereof, and terminates at a holding surface 58b that extends parallel to main plug panel section 54. Cut-out recess 58 preferably extends along the entire length of the bent end section 56, although the present invention is not so limited, that is, cut-out recess 58 can extend along only a part of the length of bent end section 56, or there may be a plurality of spaced apart cut-out recesses 58.

Further, each bent end section 56 has a lower beveled end 56a.

The inclined surface 58a of each inwardly directed projection 58 continues upwardly at an angle with an inclined wall 60, the free end 60a of which is intended to abut against the undersurface of main plug panel section 54 when inwardly directed projection 46 is positioned in cut out recess 58 so as to provide a snap-tight like action with a tight fit so that there is little or no play, whereby secondary plug wall panels 52 are tightly held in position. However, inclined walls 60 are not a requirement of the present invention, and can be eliminated.

To assemble secondary plug wall panels 52 with main fastening extrusions 32, it is only necessary to press bent end sections 56 into the space between a post wall 42 and an adjacent bent end securing wall 44b, whereby the bent end securing wall 44b is biased away from the post wall 42, until holding surface 58b passes by holding surface 46b, whereupon bent end securing wall 44b springs back to its original position, whereby nose-shaped inwardly directed projection 46 engages in nose-shaped cut-out recess 58. In such case, holding surface 46b engages holding surface 58b to prevent escape of bent end section 56. In such position, free end 60a of inclined wall 60 is in abutting or near abutting relation with the underside of the respective planar main plug panel section 54.

Further, main plug panel section 54 can have a plurality of openings 55 through which light projects outwardly from a light source 57, such as a bulb, LED lights, etc., in spacing 45, as well as providing ventilation for spacing 45. Alternatively, openings 55 can be closed by transparent windows 59. In addition, other elements 61, such as electrical systems, such as cables, pipes for carrying various gases and/or liquids, solar panel pipes, a heat exchanger system, etc. can extend within spacing 45, being hidden by reason of main plug panel section 54.

Figure 7:
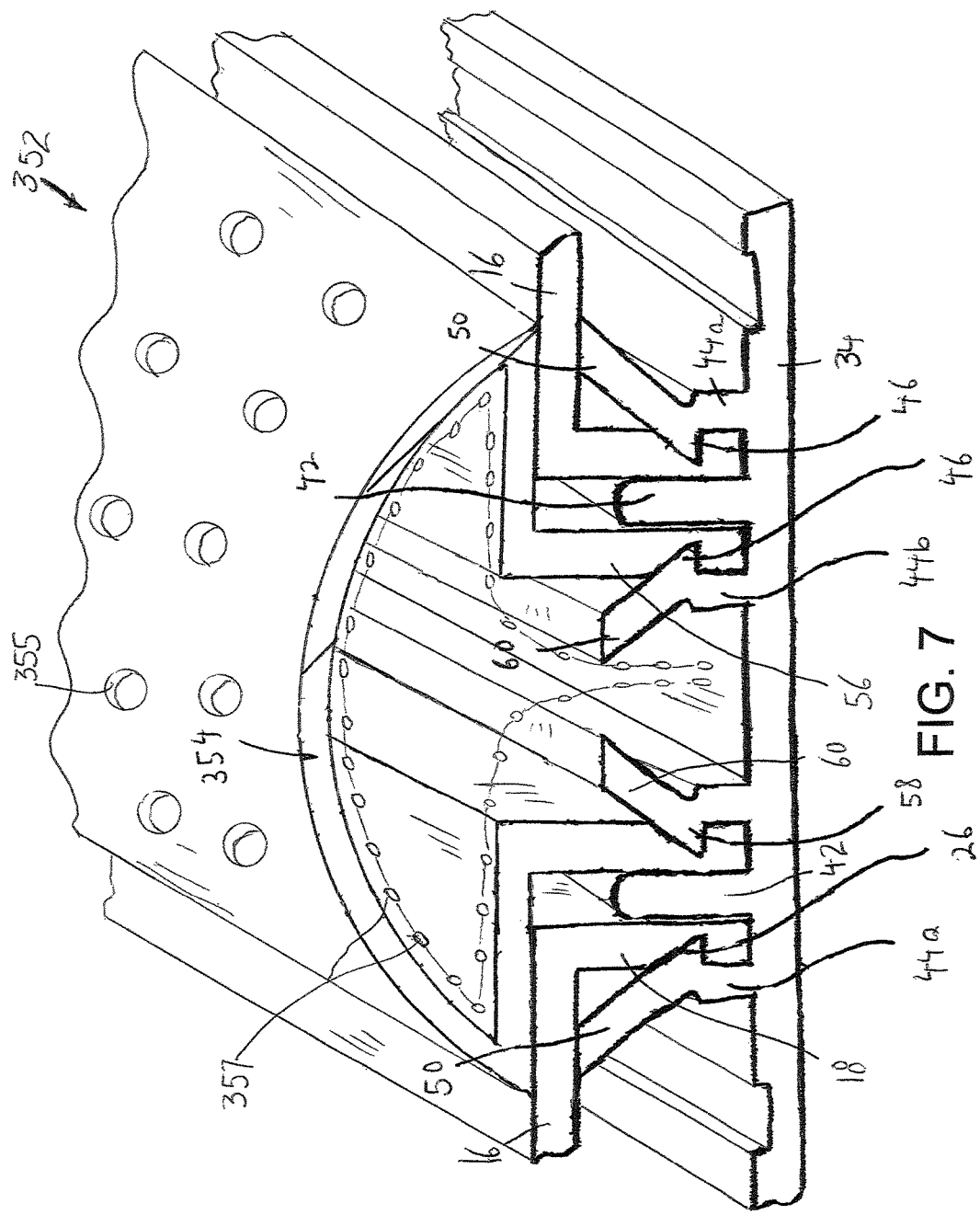
FIG. 7 is a perspective view of a system for mounting primary wall panels and third modified plug wall panels over an existing wall structure according to the present invention.
Figure 10:
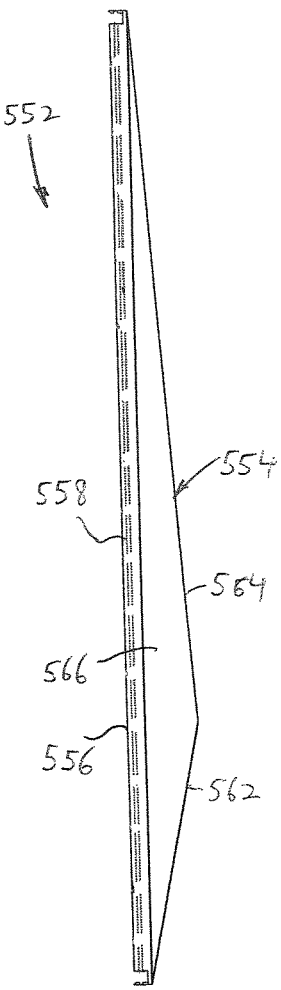
FIG. 10 is a side elevational view of the fifth modified plug wall panel.
Figure 11:
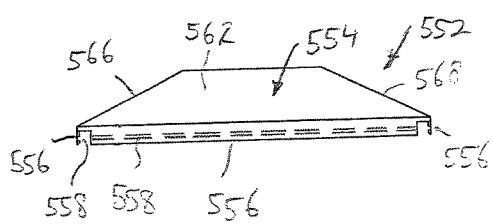
FIG. 11 is an end elevational view of the fifth modified plug wall panel.
Figure 12:
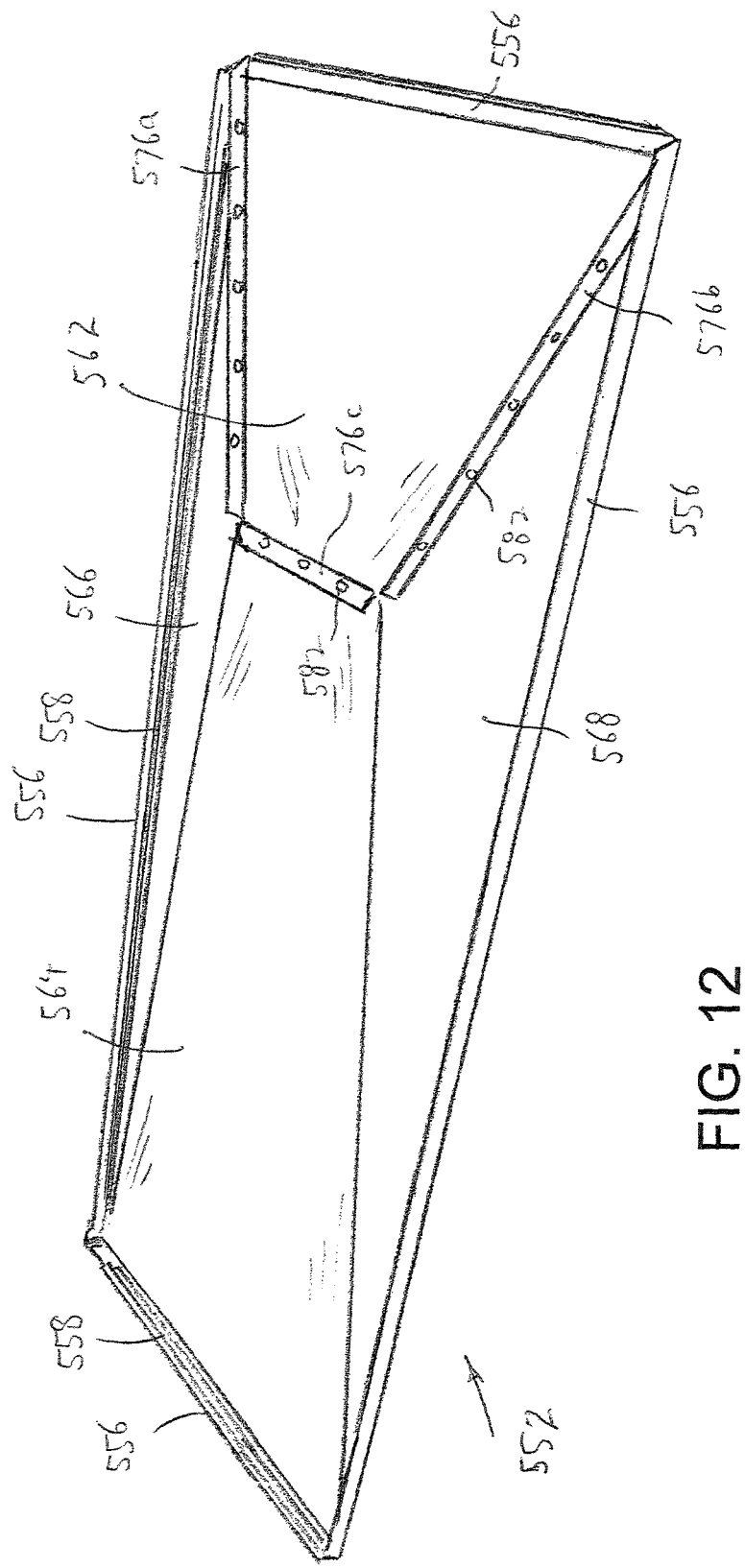
FIG. 12 is a bottom perspective view of the fifth modified plug wall panel.
Figure 14:
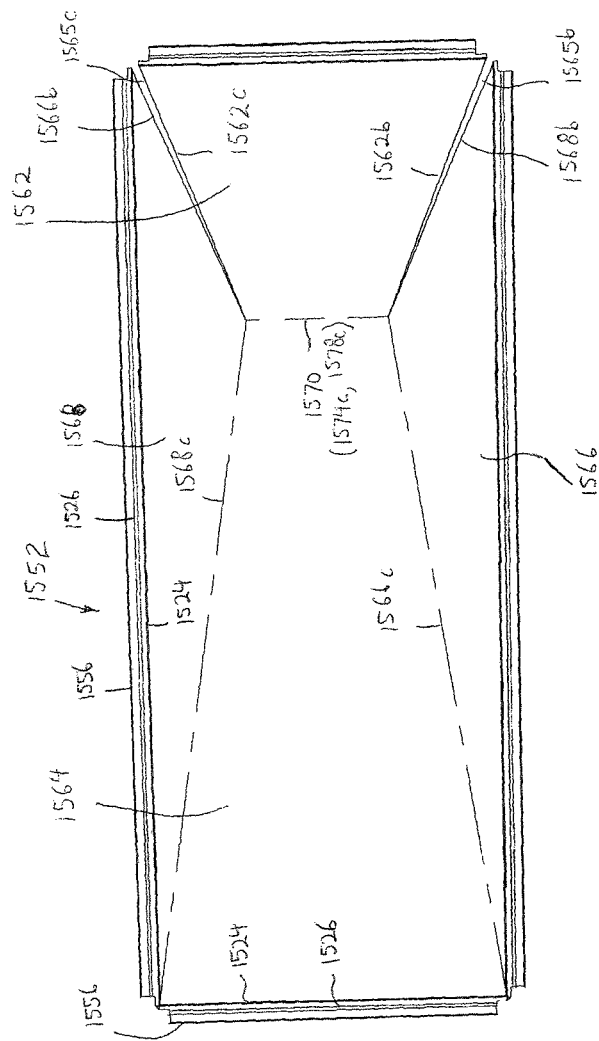
FIG. 14 is a bottom plan view of a blank for a sixth modified plug wall panel.
Figure 17:
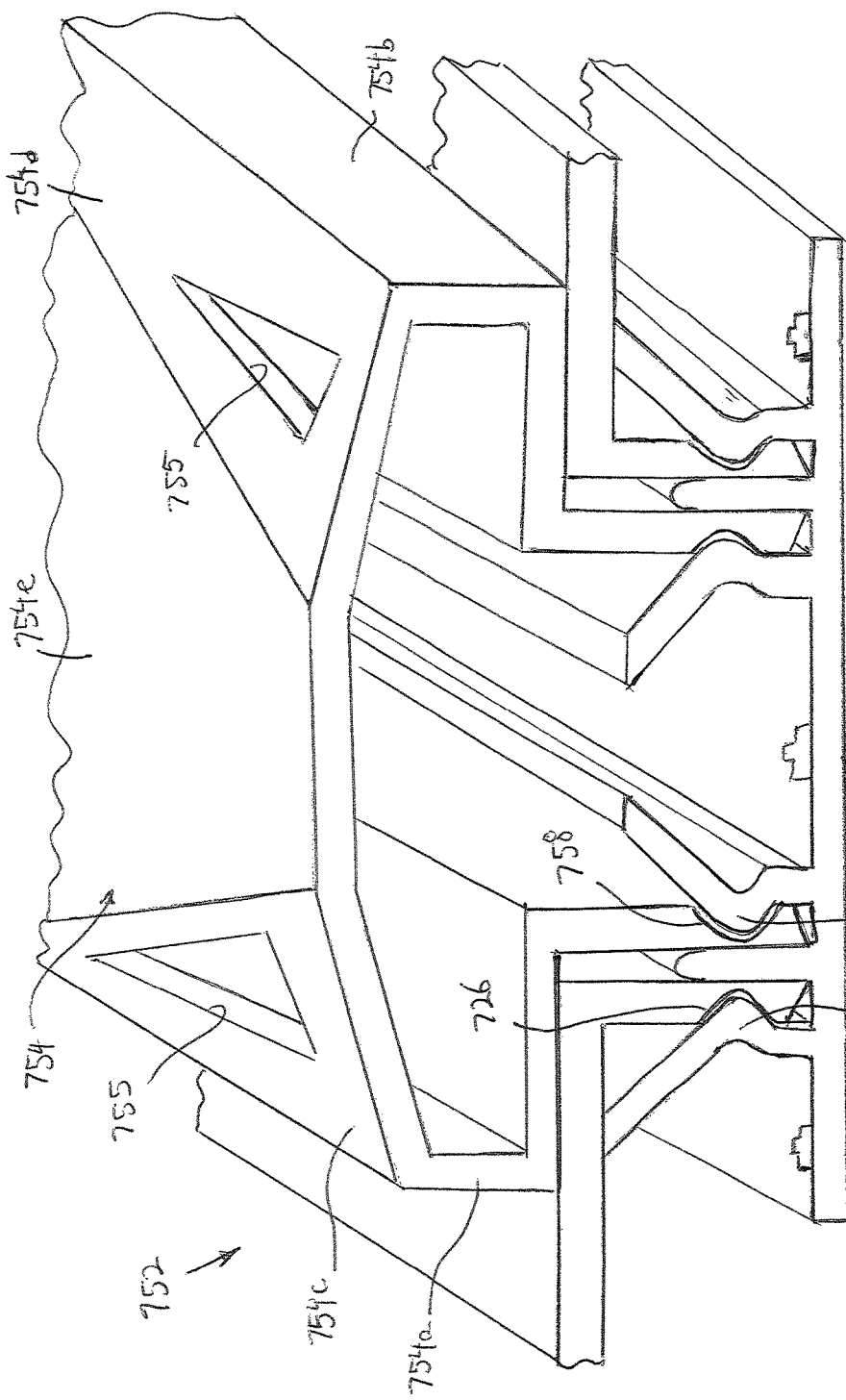
FIG. 17 is an elevational view of an eighth modified plug wall panel removably mounted to an existing wall structure.

It will be appreciated that many variations can be provided with the present invention within the scope of the claims. For example, the shapes of the projections 46 and the corresponding cut-out recesses 26, 58 can vary in accordance with any of the different shapes and sizes of the same elements disclosed in the aforementioned U.S. Pat. Nos. 8,739,483, 8,925,271 and 8,966,849 to the same inventor herein, the entire disclosures of which are incorporated herein by reference. Thus, for example, recesses 26, 58 can be square shaped recesses as shown in FIGS. 14 and 17 of U.S. Pat. No. 8,739,483 and FIG. 10 of U.S. Pat. No. 8,925,271 for engagement with nose-shaped projections 46. Alternatively, rather than pressing bent end sections 18, 56 into the spacing between post walls 42 and bent end securing walls 44a, 44b, bent end sections 18, 56 can be slid lengthwise therein. In such case, both projections 46 and cut-out recesses 26, 58 can have, for example, a square cross-sectional shape as shown in FIG. 7 of U.S. Pat. No. 8,925,271 or a trapezoidal cross-sectional shape as shown in FIGS. 11 and 12 of U.S. Pat. No. 8,925,271, or the like. Alternatively, rather than permanently locking in place, bent end sections 18 can be formed to be removed from extrusions 32 to replace a wall panel 12. In such case, V-shaped cut-out recesses 26, 58 would be provided, and projections 46 would have a similar V-shape, for example, of the type disclosed in U.S. patent application Ser. No. 14/044,606 to the same applicant herein, and the entire disclosure of which is incorporated herein by reference. Thus, recesses 26 can have a shape, for example, of a square shape, a rectangular shape, a triangular shape, a triangular shape with a rounded upper surface, a trapezoidal shape, and a cylindrical shape.

Figure 5:
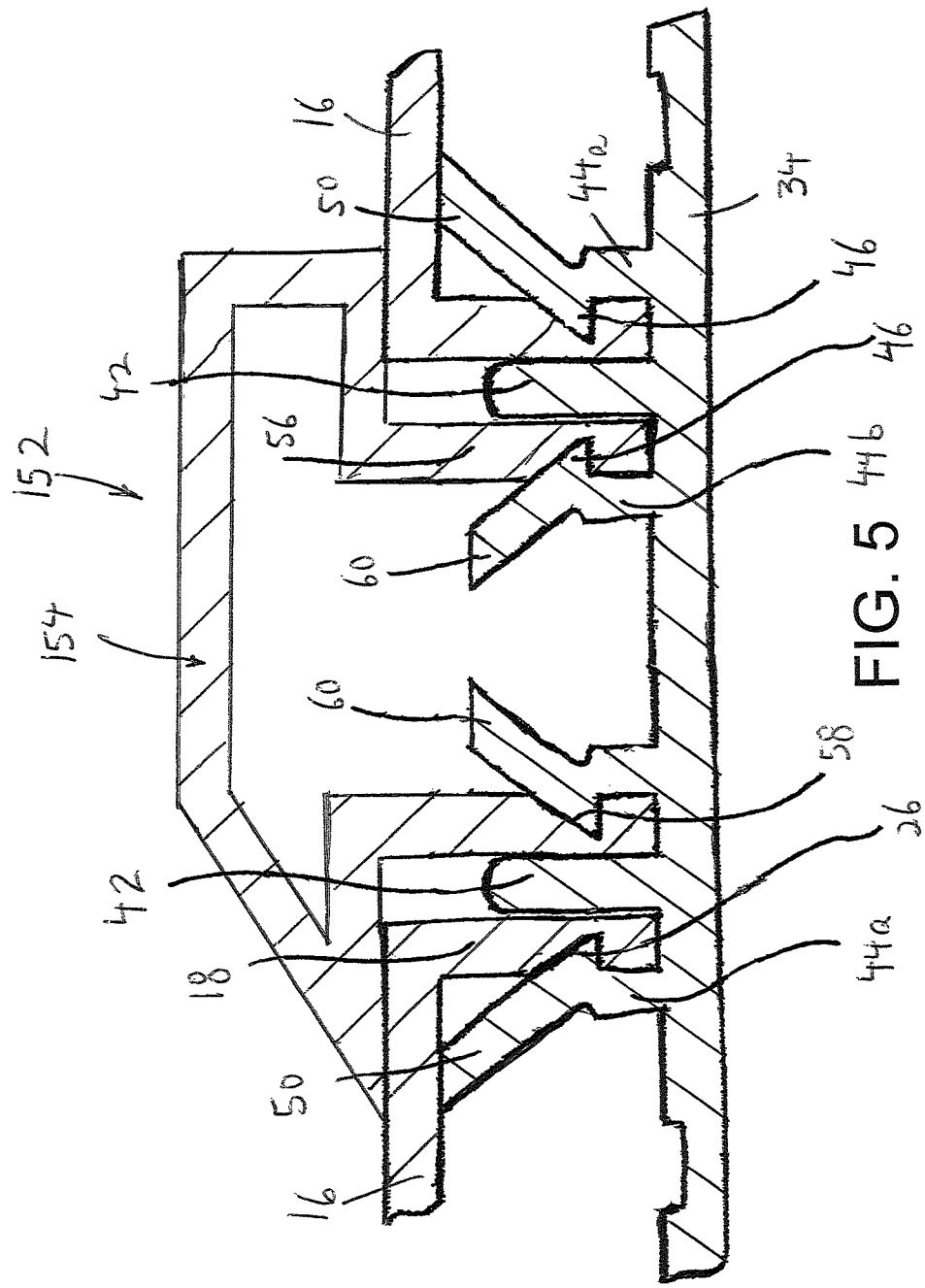
FIG. 5 is a cross-sectional view of a system for mounting primary wall panels and first modified plug wall panels over an existing wall structure according to the present invention.

Further, although bent end securing walls 44a, 44b are shown to be straight walls, extending at right angles from base section 34, they can have other configurations, such as the curved shapes as shown in U.S. Pat. No. 8,739,483. It will be appreciated that, with this arrangement, the plug elements can assume various shapes and sizes, to provide different aesthetic appearances. For example, as shown in FIG. 5, a first modified plug wall panel 152 is provided which is the same as plug wall panel 52, except that planar main plug panel section 54 is replaced with a trapezoidal shaped main plug panel section 154 in cross-section which overlies upper surfaces of main panel sections 16 of the adjacent wall panels 12.

Figure 6:
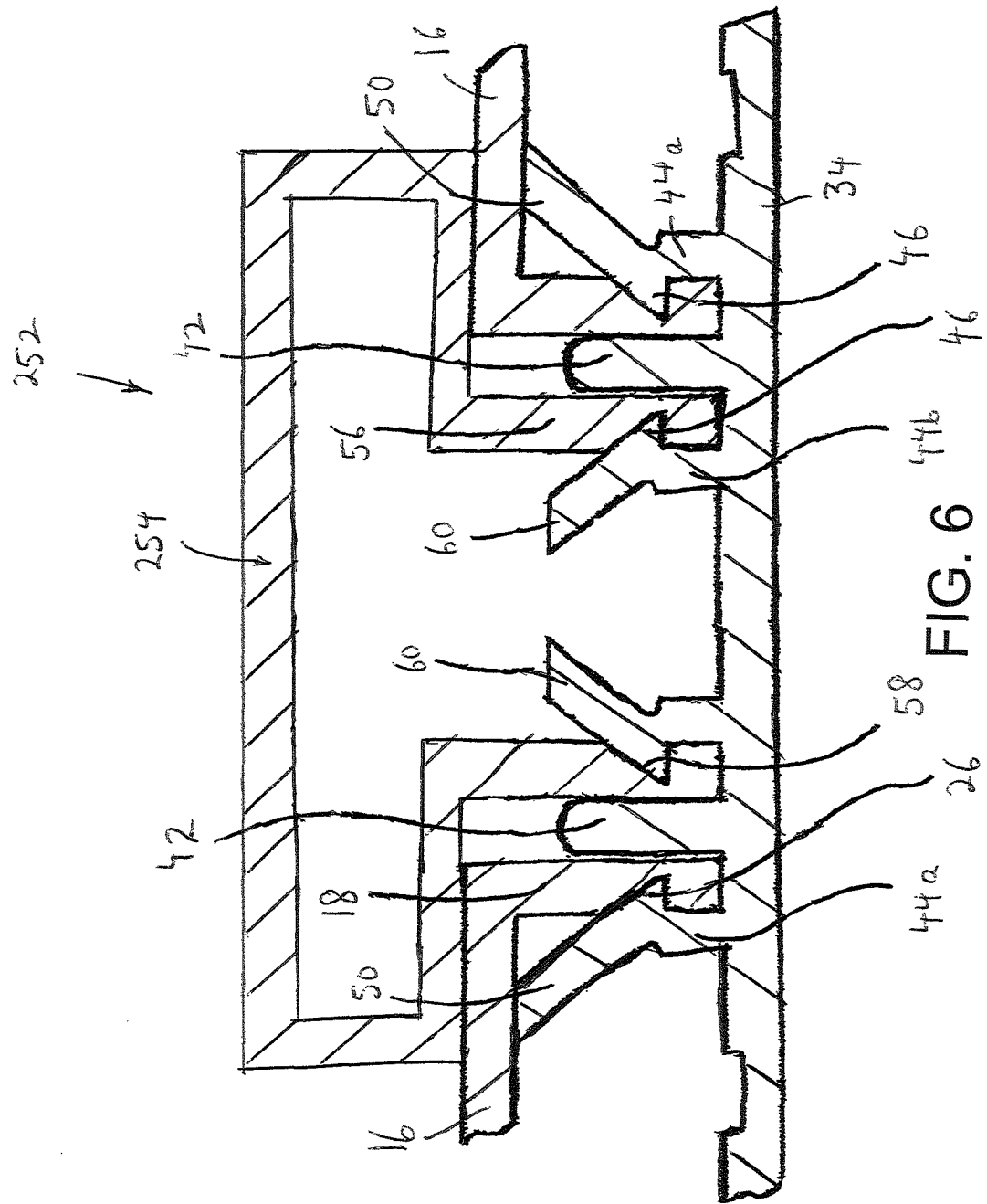
FIG. 6 is a cross-sectional view of a system for mounting primary wall panels and second modified plug wall panels over an existing wall structure according to the present invention.

Another variation is shown in FIG. 6, in which a second modified plug wall panel 252 is provided which is the same as plug wall panel 52, except that planar main plug panel section 54 is replaced with a rectangular shaped main plug panel section 254 in cross-section which overlies upper surfaces of main panel sections 16 of the adjacent wall panels 12.

Another variation is shown in FIG. 7, in which a third modified plug wall panel 352 is provided which is the same as plug wall panel 52, except that planar main plug panel section 54 is replaced with a mushroom shaped main plug panel section 354 in cross-section which overlies upper surfaces of main panel sections 16 of the adjacent wall panels 12. In addition, LED lights 357 are shown within spacing 345 immediately below mushroom shaped main plug panel section 354. In such case, a plurality of openings 355 are provided in mushroom shaped main plug panel section 354 to permit escape of the light from LED lights 357, and/or to provide ventilation. Openings 355 can be closed by transparent windows of the type shown in FIG. 4.

Figure 8:
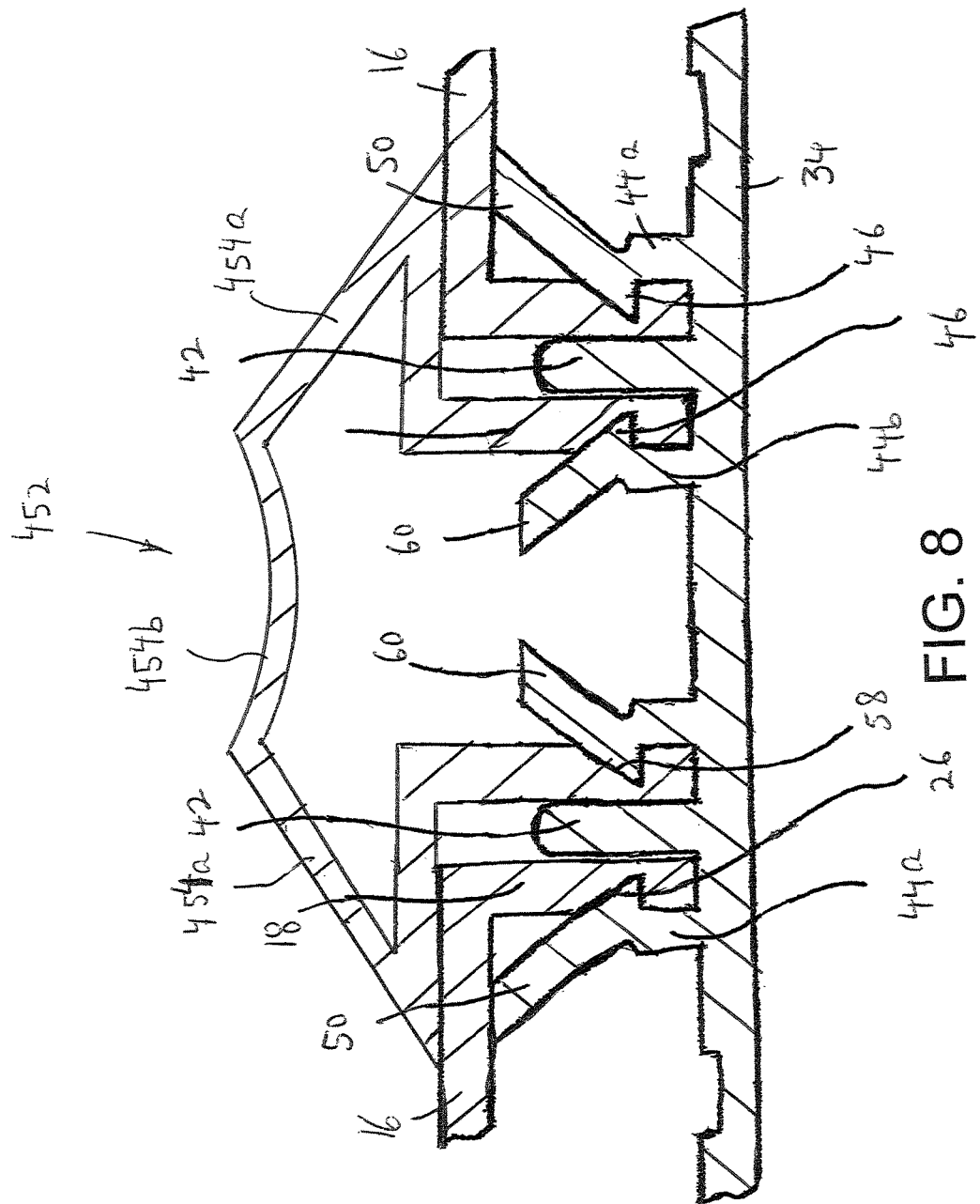
FIG. 8 is a cross-sectional view of a system for mounting primary wall panels and fourth modified plug wall panels over an existing wall structure according to the present invention.
Figure 9:
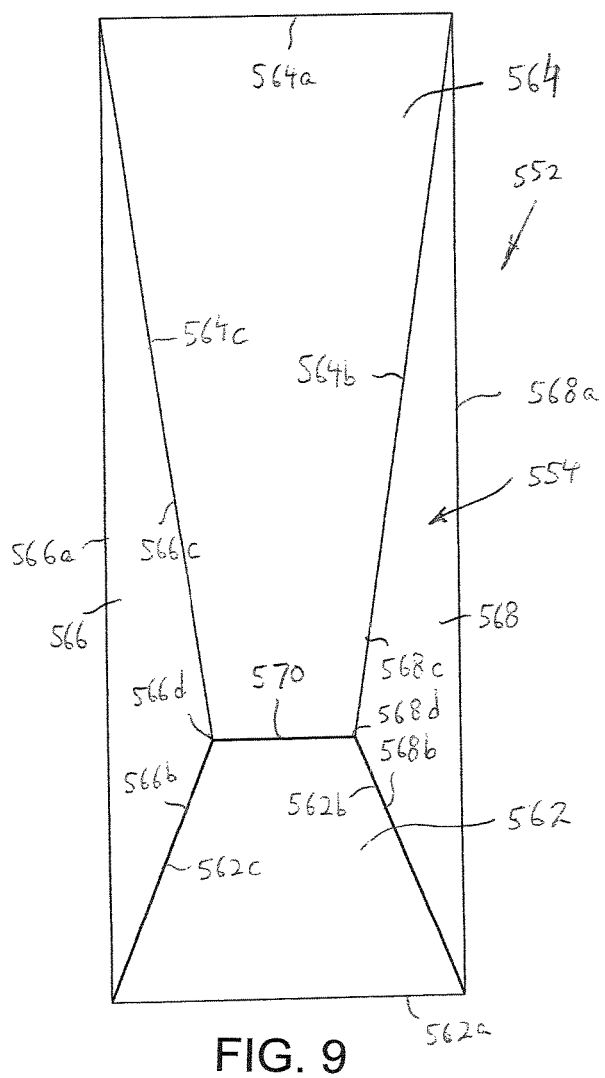
FIG. 9 is a top plan view of a fifth modified plug wall panel according to the present invention.

Another variation is shown in FIG. 8, in which a fourth modified plug wall panel 452 is provided which is the same as plug wall panel 352, except that the upper curved surface of the mushroom shaped main plug panel section 354 is replaced with outwardly inclined surfaces 454a that meet at a central, upper concave surface 454b, and in which fourth modified plug wall panel 452 also overlies upper surfaces of main panel sections 16 of the adjacent wall panels 12.

The advantage of main plug panel sections 154, 254, 354, 454 overlying upper surfaces of main panel sections 16 of the adjacent wall panels 12, is that a seal is provided thereat to prevent liquids from entering therein. This can be further enhanced by a sealant between these elements.

FIGS. 9-12 show a fifth modified plug wall panel 552 of a different construction. Specifically, plug wall panel 552 is formed with a main plug panel section 554 having a rectangular perimeter and four bent end sections 556 at each side of the rectangular main plug panel section 554, with each bent end section 556 including a cut-out recess 558 on the inner surface thereof. Main plug panel section 554 has a roof like shape that has four surfaces 562, 564, 566 and 568 that all meet at a common line 570, and each extending up and inwardly from an edge of the rectangular perimeter of main plug panel section 554. Surface 562 has a trapezoidal shape with the larger side 562a thereof of the two parallel sides of the trapezoid forming a shorter edge of the rectangular perimeter and the shorter side of the two parallel sides of the trapezoid being formed by the common line 570. Surface 564 also has a trapezoidal shape with the larger side 564a thereof of the two parallel sides of the trapezoid forming the other shorter edge of the rectangular perimeter and the shorter side of the two parallel sides of the trapezoid being formed by the common line 570. Trapezoidal surface 564 has longer side edges 564b, 564c than those 562b, 562c of trapezoidal surface 562, so that common line 570 is off center to one side of the rectangular perimeter. As a result of this construction, surfaces 566 and 568 have triangular shapes, with one side 566a, 568a of each triangular shaped surface 566, 568 forming a longer edge of the rectangular perimeter, a second side 566b, 568b of each triangular shaped surface 566, 568 connected with one side edge 562c, 562b of trapezoidal surface 562, and the third side 566c, 568c of each triangular shaped surface 566, 568 connected with one side edge 564c, 564b of trapezoidal surface 564. The upper apices 566d, 568d of triangular shaped surfaces 566, 568 are formed at opposite ends of common line 570.

Figure 13:
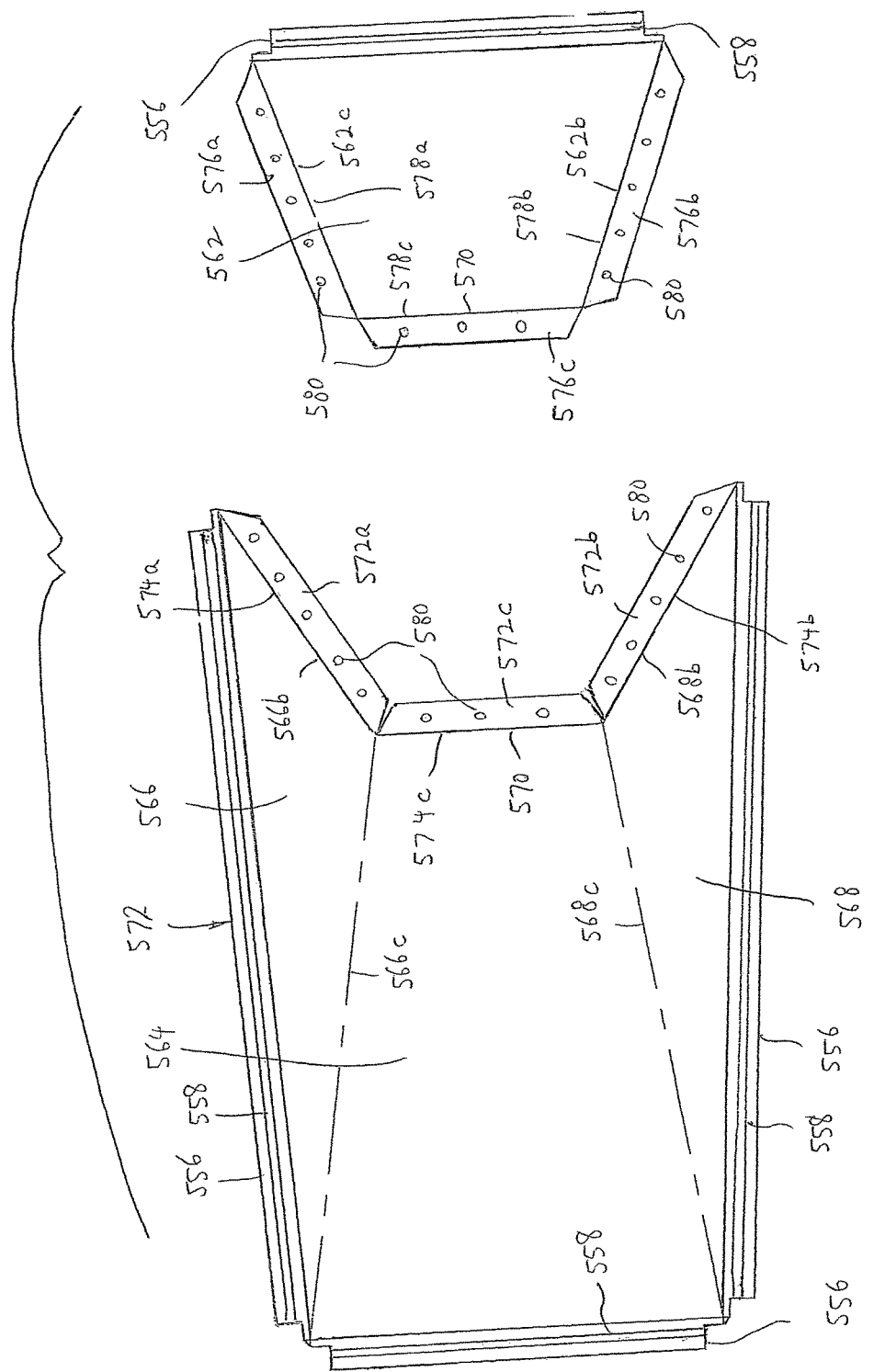
FIG. 13 is a bottom plan view of the fifth modified plug wall panels, before assembly thereof.

Because it is difficult to form plug wall panel 552 in a single piece, surfaces 564, 566 and 568 are formed as a single piece element 572, as shown in FIG. 13, with fold lines thereof corresponding to the third sides 566c, 568c of each triangular shaped surface 566, 568. Trapezoidal surface 562 is formed separate from single piece element 572. In order to connect trapezoidal surface 562 to single piece element 572, single piece element 572 is formed with three foldable edge strips 572a, 572b and 572c connected to the second sides 566b, 568b of triangular shaped surfaces 566, 568 and to common line 570. Each strip 572a, 572b and 572c is bendable inwardly at a right angle along a respective fold line 574a, 574b and 574c.

In like manner, trapezoidal surface 562 is formed with three edge strips 576a, 576b and 576c connected to the non-parallel sides 562c, 562b of the trapezoid shape and to the shorter 570 of the parallel sides of the trapezoid shape. Each strip 576a, 576b and 576c is bendable inwardly at a right angle along a respective fold line 578a, 578b and 578c.

Further, each strip 572a, 572b and 572c and each strip 576a, 576b and 576c includes a plurality of spaced openings 580 therealong.

To assemble trapezoidal surface 562 with single piece element 572, and with each strip 572a, 572b and 572c and each strip 576a, 576b and 576c folded inwardly, strips 572a, 576a; strips 572b, 576b; and strips 572c, 576c are brought into contact with other, with the openings 580 in alignment, and screws, rivets or the like 582 are inserted therein. Alternatively, rather than using screws, rivets or the like 582, any other suitable securing means can be used, for example, clamps, structural adhesives, structural caulking, aluminum strip flashing or tape secured by a structural adhesive or structural caulking or itself having a self-sticking material, or the like. Because each strip 572a, 572b and 572c and each strip 576a, 576b and 576c is folded inwardly, they are hidden from view when installed on the existing wall 14.

Figure 15:
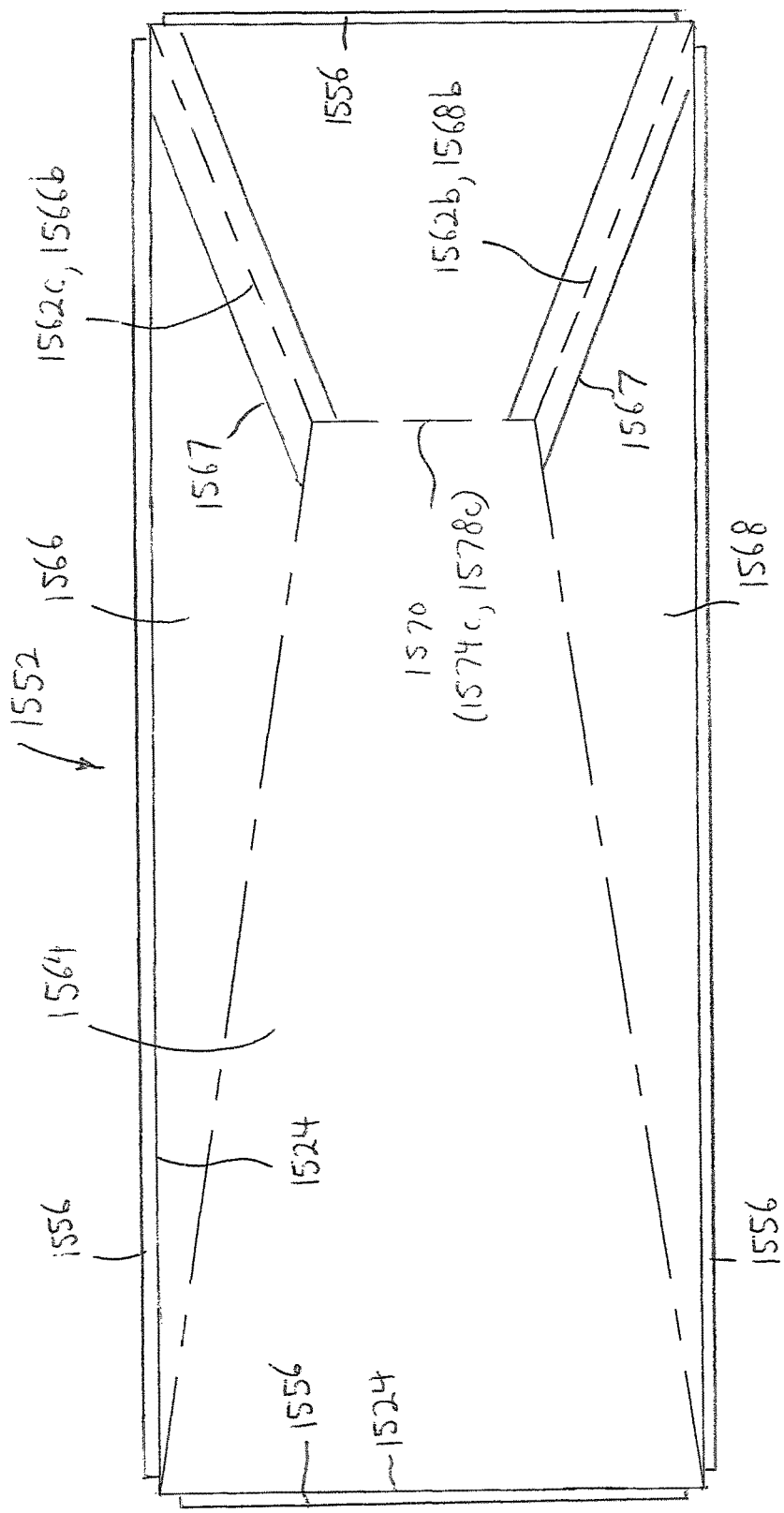
FIG. 15 is a bottom plan view of the sixth modified plug wall panel in assembled condition.

Alternatively, a sixth modified plug wall panel 1552 can be formed from a single stamped or cut element, as shown in FIGS. 14 and 15, in which elements corresponding to those of fifth modified plug wall panel 552 are incremented by 1000. In this case, shorter side 1578c of trapezoidal surface 1562 is connected with the shorter side 1574c of trapezoidal surface 1564 along common line 1570 which serves as a fold line, and edge strips 572a, 572b, 572c, 576a, 576b and 576c are eliminated. Side edges 1562b and 1568b are not connected to each other, and are separated by a small V-shaped gap 1565b, and in like manner, side edges 1562c and 1566b are not connected to each other, and are separated by a small V-shaped gap 1565c. In this manner, as shown in the assembled configuration of FIG. 5, when triangular surfaces 1566 and 1568 are folded along side edges 566c and 568c and when trapezoidal surface 1562 is folded relative to trapezoidal surface 1564 along common line 1570, side edges 1562b and 1568b are in abutting relation, and side edges 1562c and 1566b are in abutting relation, and can be connected together in any suitable manner. For example, as shown in FIG. 15, these side edges can be connected together by tape or aluminum strip flashing 1567 secured by a structural adhesive or structural caulking or itself having a self-sticking material, at the underside so as not to be visible from the outside. In addition, as shown in FIG. 15, bent end sections 1556 having cut-out recesses 1526 are bent down along V-shaped cut-outs 1524.

Figure 16:
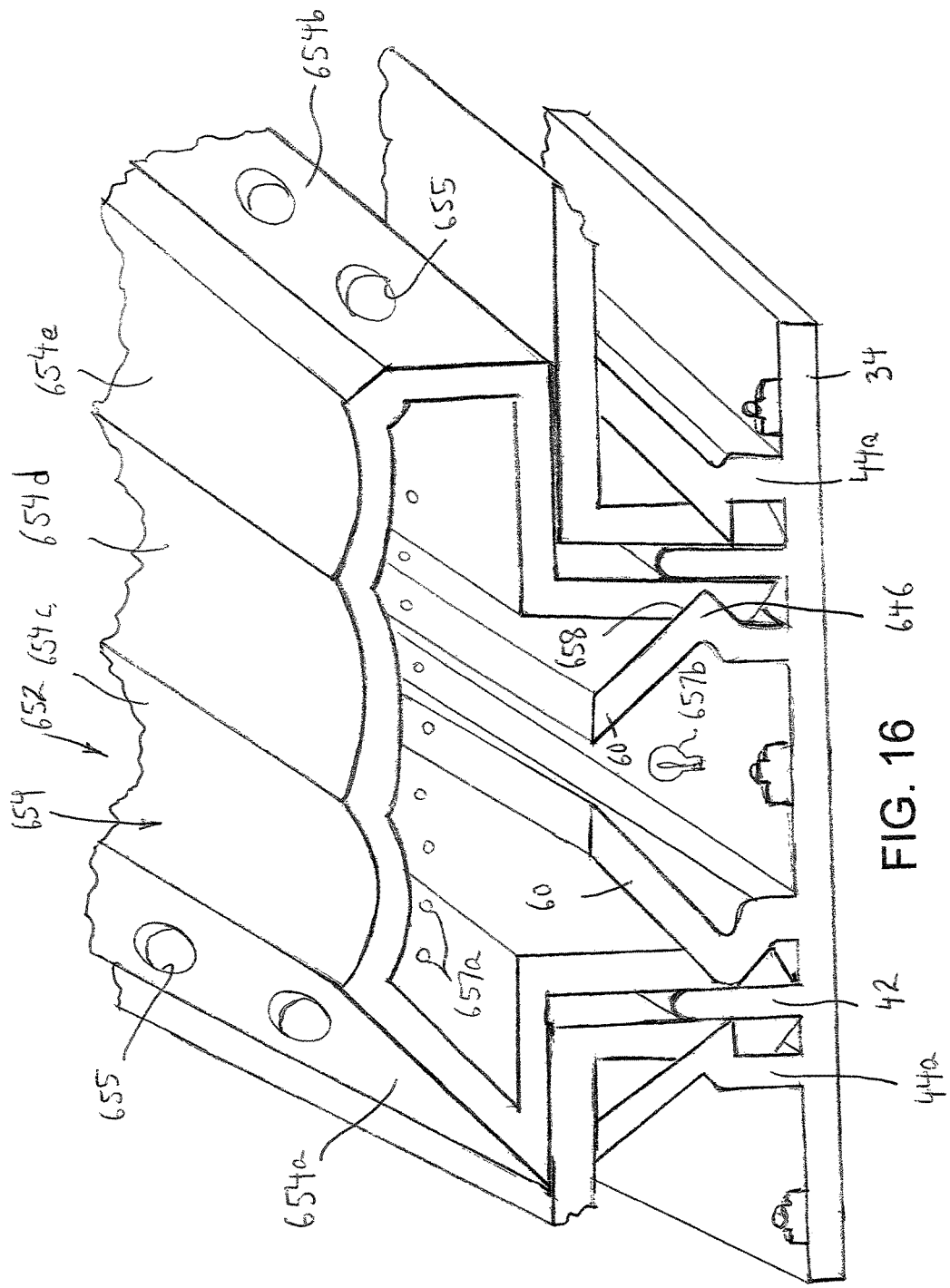
FIG. 16 is an elevational view of a seventh modified plug wall panel mounted to an existing wall structure.

Another variation is shown in FIG. 16, in which a seventh modified plug wall panel 652 is provided which is similar to plug wall panel 452, except that upper concave surface 454 is replaced with an upper wave-like section 654 formed by three contiguous upper concave surfaces 654c, 654d and 654e. Also, at only one side, there is an outwardly inclined surface or side panel 654a that meets one edge of upper wave-like section 654, and the opposite end provides a generally rectangular shaped side panel 654b similar to that of main plug panel section 254. In addition, openings 655 are provided in the side panels 654a and 654b for providing light from LED lights 657a and/or light bulbs 657b within seventh modified plug wall panel 652 and/or ventilation. In addition, it is noted that cut-out recesses 658, and projections 646 have V-shaped cross-sectional profiles, which secure seventh modified plug wall panel 652 in position, but also permit seventh modified plug wall panel 652 to be pulled out and replaced by another plug wall panel.

Another variation is shown in FIG. 17, in which an eighth modified plug wall panel 752 is provided which is similar to plug wall panel 252, except that upper concave surface 254 is replaced with an upper roof-like section 754 formed by three contiguous upper planar surfaces with the outer triangular planar surfaces 754c and 754d inclined upwardly from side panels 754a and 754b, and the center trapezoidal planar surface 754e connected between side edges of triangular planar surfaces 754c and 754d. In addition, triangular openings 755 are provided in triangular planar surfaces 754c and 754d for providing light from lights (not shown) within eighth modified plug wall panel 752 and/or ventilation. In addition, it is noted that cut-out recesses 726 and 758, and projections 746 have V-shaped or arcuate cross-sectional profiles, which secure eighth modified plug wall panel 752 in position, but also permit eighth modified plug wall panel 752 to be pulled out and replaced by another plug wall panel.

Figure 18:
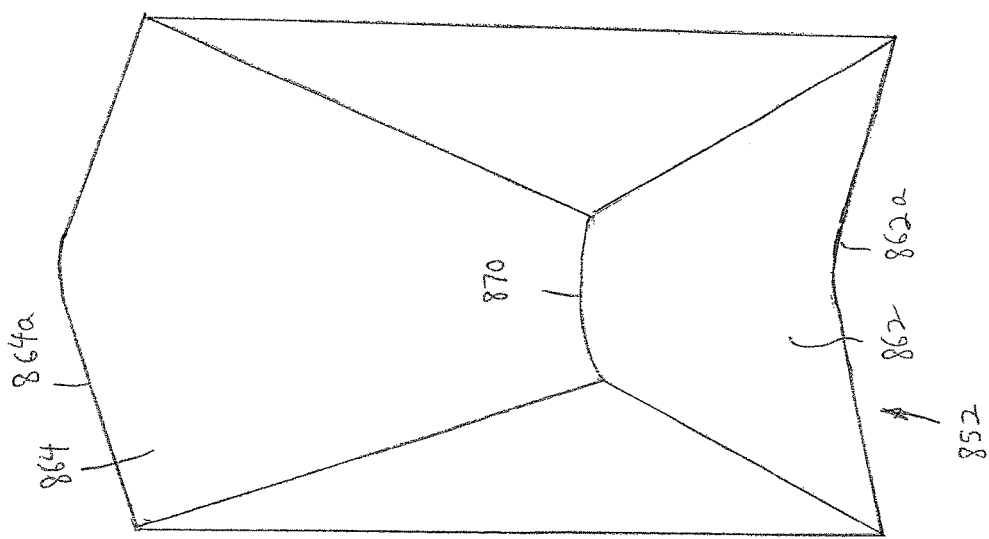
FIG. 18 is a top plan view of a ninth modified plug wall panel mounted to an existing wall structure.

Another variation is shown in FIG. 18, in which a ninth modified plug wall panel 852 is provided which is similar to plug wall panel 552, except that larger side 864a of trapezoidal surface 864 and larger side 562a of trapezoidal surface 652 are V-shaped rather than being straight, and common line 870 is curved.

Figure 19:
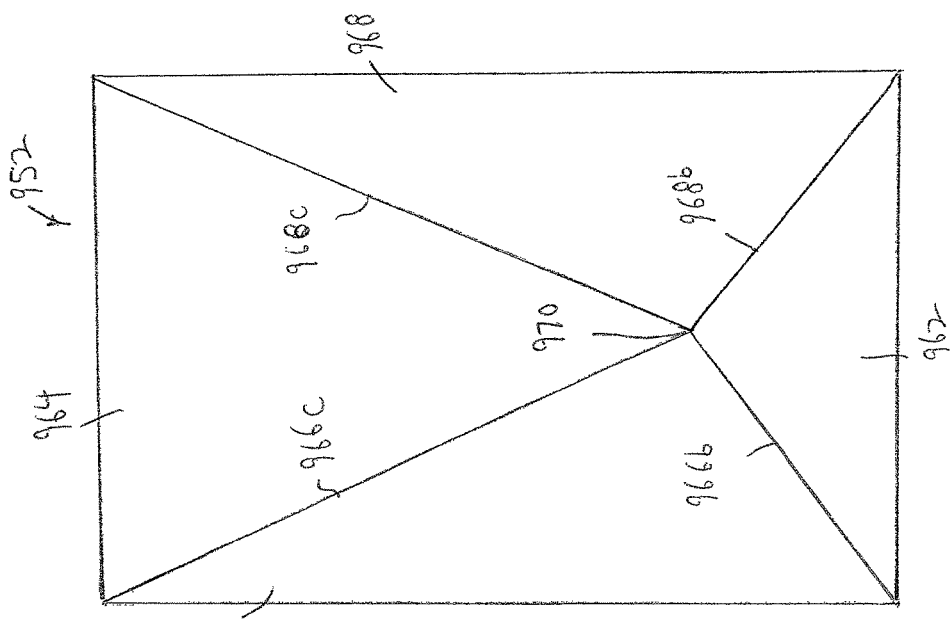
FIG. 19 is a top plan view of a tenth modified plug wall panel mounted to an existing wall structure.

Another variation is shown in FIG. 19, in which a tenth modified plug wall panel 952 is provided which is similar to plug wall panel 552, except that side edges 966b, 966c, 968b and 968c of triangular surfaces 966 and 968 meet at a common point 970 rather than a common line. As a result, the remaining surfaces 962 and 964 are also formed as triangular surfaces, thereby imparting a pyramid shape to tenth modified plug wall panel 952.

Figure 20:
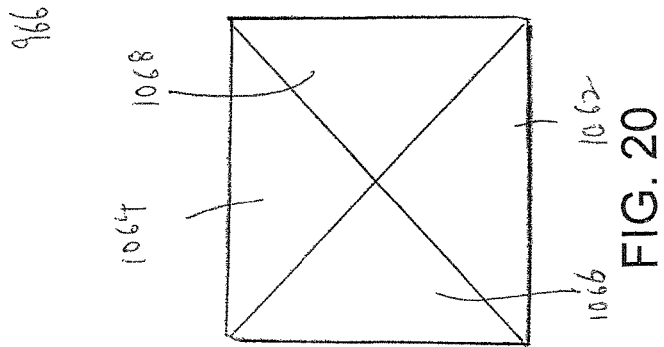
FIG. 20 is a top plan view of an eleventh modified plug wall panel mounted to an existing wall structure.

Another variation is shown in FIG. 20, in which an eleventh modified plug wall panel 1052 is provided which is similar to plug wall panel 952, except that all triangular surfaces 1062, 1064, 1066 and 1068 are of equal sizes and shapes, so that the outer periphery of eleventh modified plug wall panel 1052 is a square.

Figure 21:
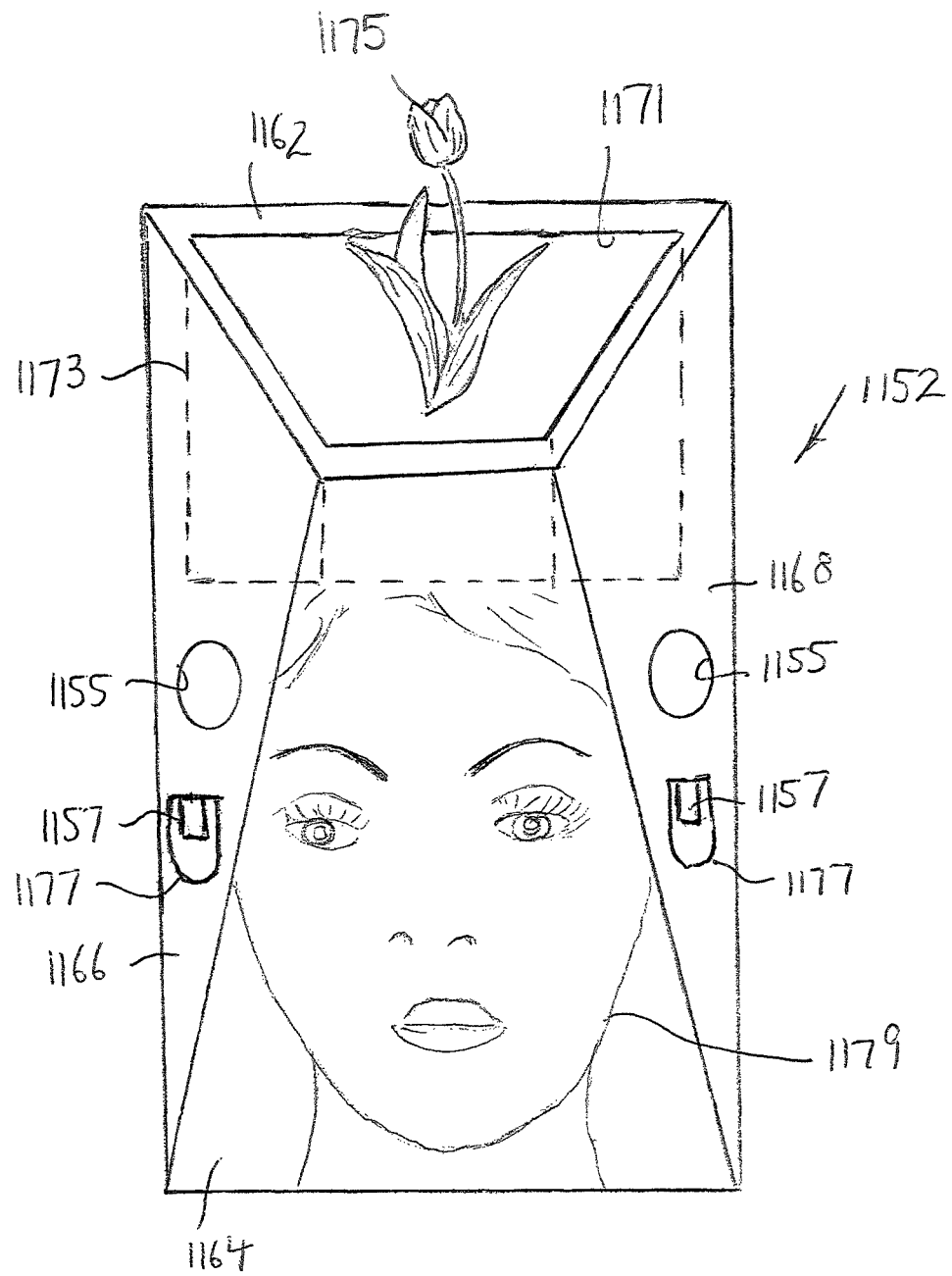
FIG. 21 is a top plan view of a twelfth modified plug wall panel mounted to an existing wall structure.

Another variation is shown in FIG. 21, in which a twelfth modified plug wall panel 1152 is provided which is similar to plug wall panel 552, except that an opening 1171 is provided in smaller trapezoidal surface 1162 and a planter box 1173 is mounted to base section 34 of main fastening extrusion 32, below opening 1171, for holding plants, flowers or other greenery 1175 therein that can extend out of opening 1171. Openings 1155 are also provided in triangular surfaces 1166 and 1168, and lights or candles 1157 are mounted to the outer surfaces of triangular surfaces 1166 and 1168 and covered by a transparent cover 1177. In addition, as shown, an aesthetic design or picture 1179 can be provided on the outer surface of trapezoidal surface 1164.

Figure 22:
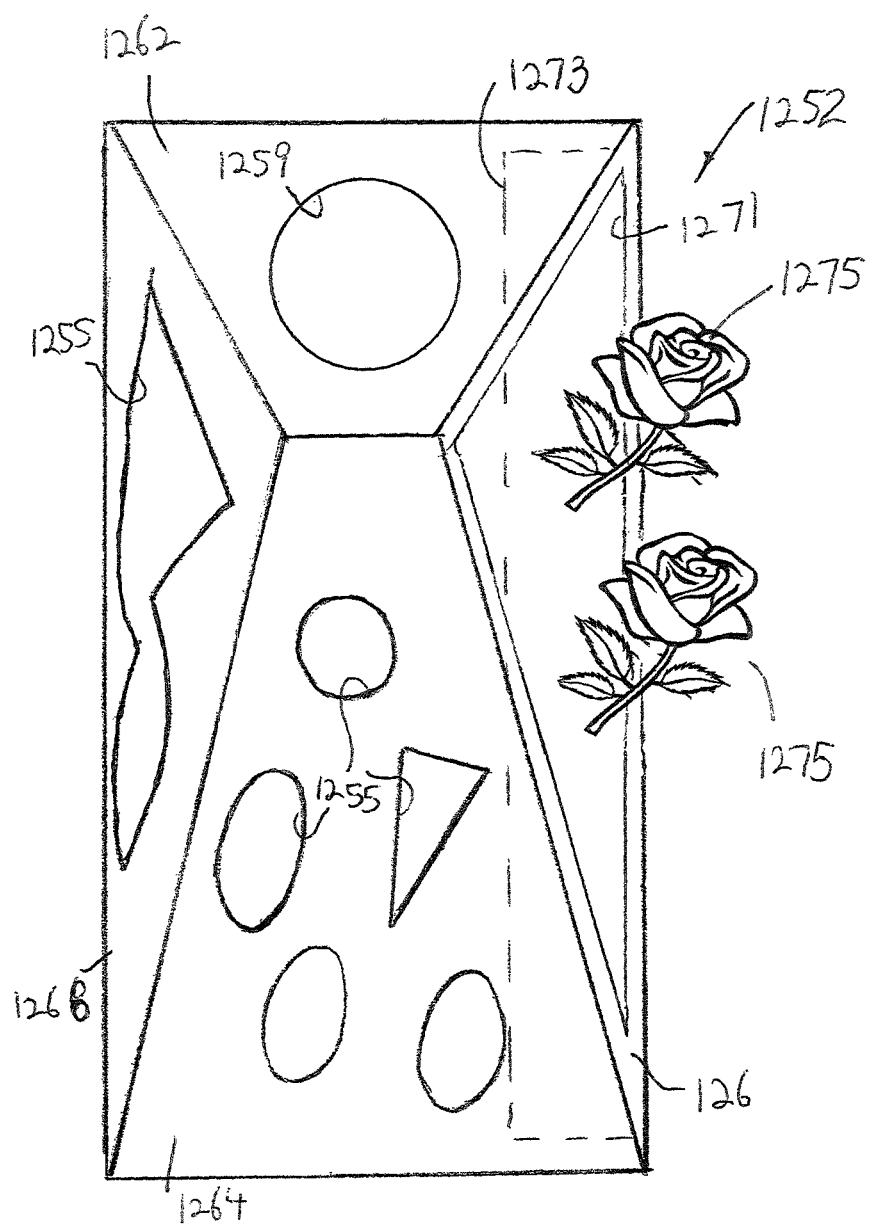
FIG. 22 is a top plan view of a thirteenth modified plug wall panel mounted to an existing wall structure.

Another variation is shown in FIG. 22, in which a thirteenth modified plug wall panel 1252 is provided which is similar to plug wall panel 1152, except that opening 1271 is provided in triangular surface 1266 and a planter box 1273 is mounted to base section 34 of main fastening extrusion 32, below opening 1271, for holding plants, flowers or other greenery 1275 therein that can extend out of opening 1271. Openings 1255 are also provided in triangular surface 1268 and larger trapezoidal surface 1264, and a transparent window 1259 is provided in smaller trapezoidal surface 1262 for emitting light from a light source (not shown) therethrough.

Figure 23:
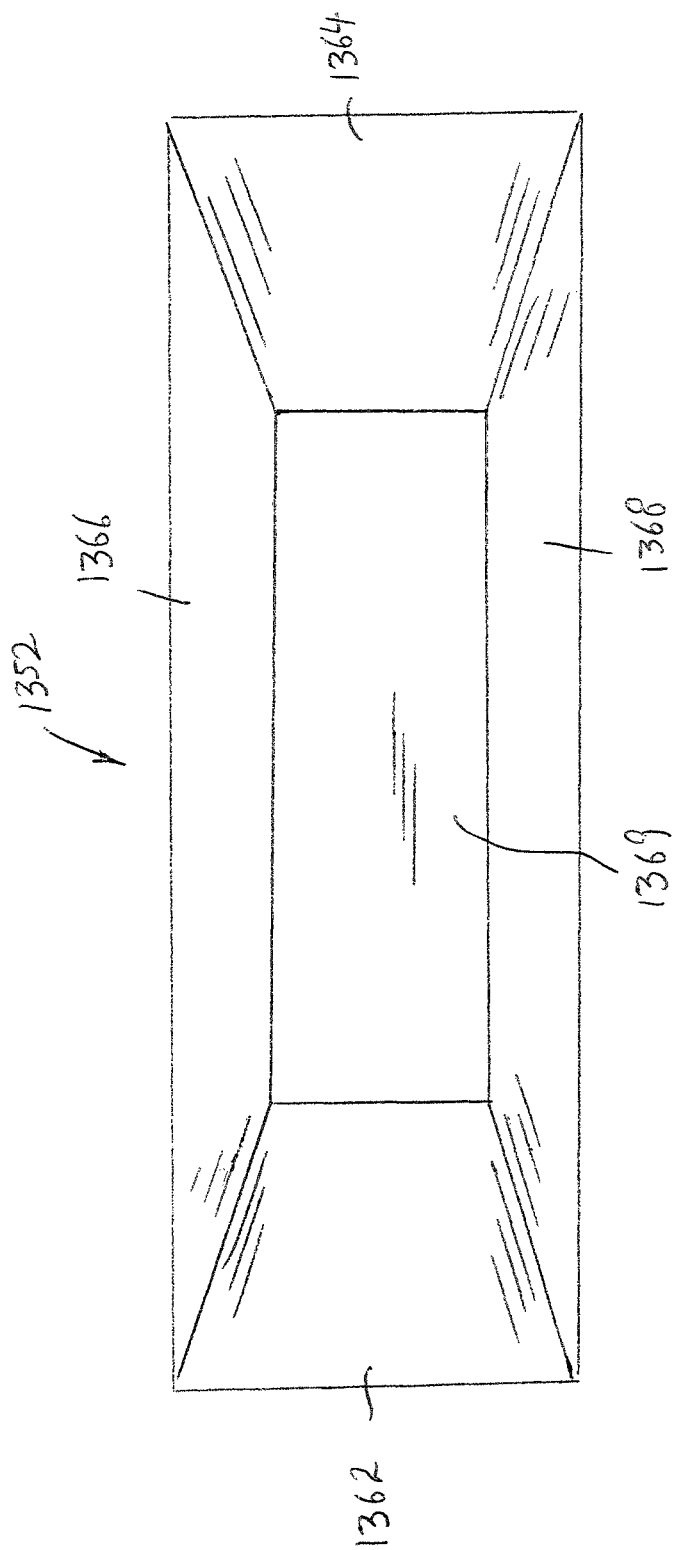
FIG. 23 is a top plan view of a fourteenth modified plug wall panel mounted to an existing wall structure.

Another variation is shown in FIG. 23, in which a fourteenth modified plug wall panel 1352 is provided which is similar to plug wall panel 552, except that triangular surfaces 566 and 568 are replaced by trapezoidal surfaces 1366 and 1368, so that all side surfaces 1362, 1364, 1366 and 1368 have trapezoidal configurations. As a result, a rectangular section 1369 is formed that is attached to the upper small sides of trapezoidal surfaces 1362, 1364, 1366 and 1368. With this arrangement, an aesthetic design or picture similar to picture 1179 can be provided on the outer surface of trapezoidal surface rectangular section 1369.

As a result of the above structure, the secondary plug wall panels 152-1552 provide a relief effect to the wall, enhancing the aesthetic appearance thereof. Specifically, main plug panel sections 154-1554 thereof are not coplanar with main panel sections 16 of primary wall panels 12, and thereby provide a three dimensional effect.

Figure 27:
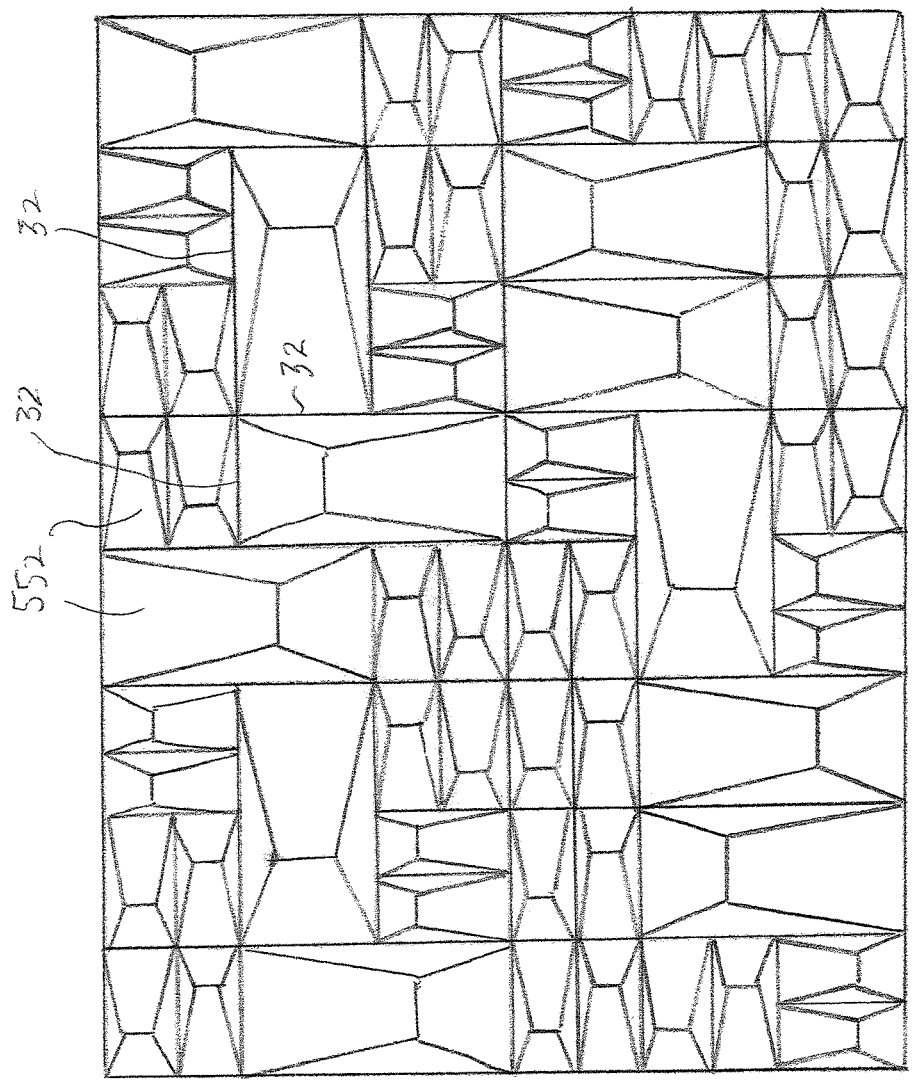
FIG. 27 is an elevational view of a plurality of a fifth modified plug wall panels mounted to an existing wall structure.

It will be appreciated, however, that the present invention is not limited to the use of secondary plug wall panels 52-1552 between adjacent primary wall panels 12, but instead, secondary plug wall panels 52-1552 can be used alone in varied arrangements on existing wall structure 14 as the sole wall panels, for example, as shown by the different sizes of fifth modified plug wall panels 552 assembled in the wall structure shown in FIG. 27, along with extrusions 32.

Figures 24, 25:
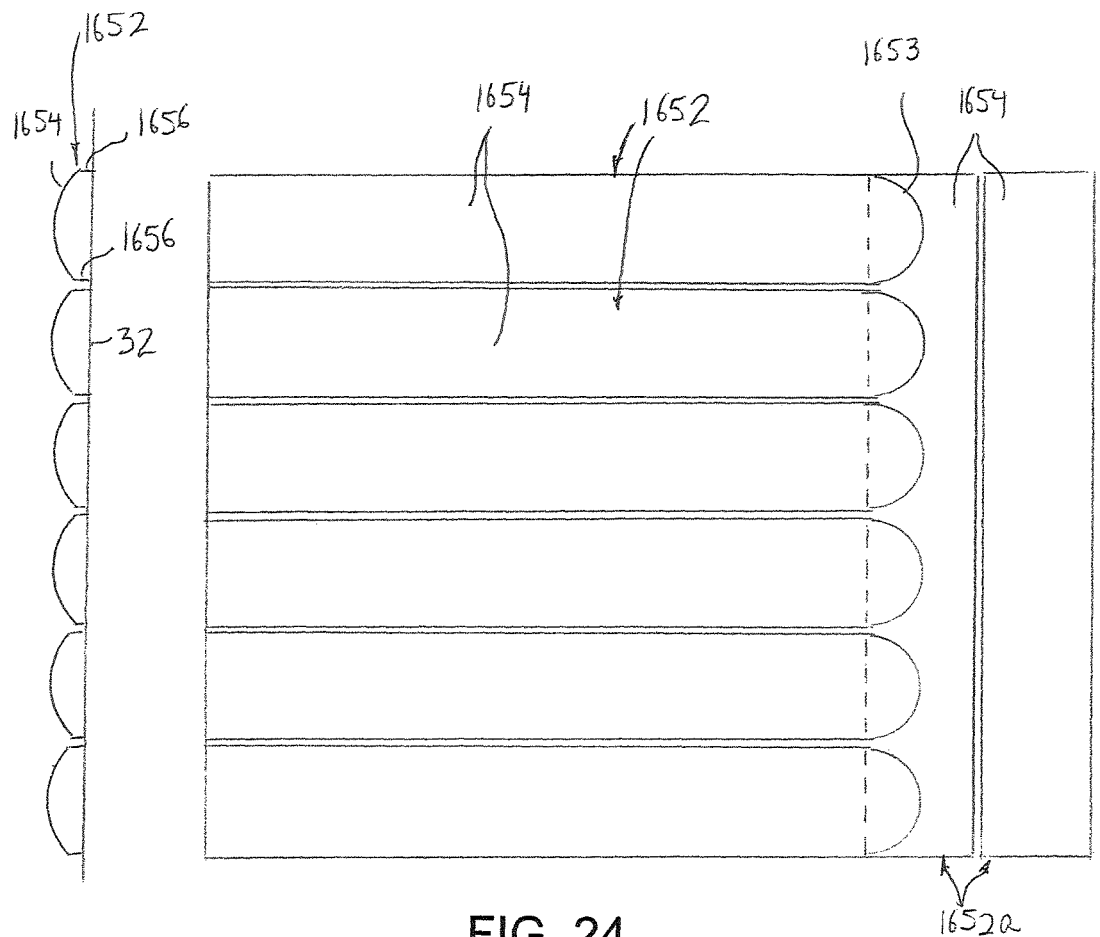
FIG. 24 is a top plan view of a fifteenth modified plug wall panel mounted to an existing wall structure.
FIG. 25 is a schematic side elevational view of the assembled fifteenth modified plug wall panels of FIG. 24.
Figure 26:
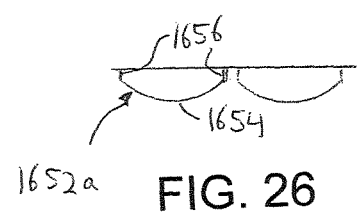
FIG. 26 is a schematic side elevational view of the transverse assembled fifteenth modified plug wall panels of FIG. 24.

Another variation is shown in FIGS. 24-26, in which secondary plug wall panels 1652 are formed with an elongated main plug panel section 1654 which is arcuate in a transverse direction thereof, and at least one end being formed with a rounded end 1653, although both ends can be rounded. Thus, as shown, the rounded ends 1653 of secondary plug wall panels 1652 overlapping and extending above main plug panel sections 1654 of transverse oriented secondary plug wall panels 1652a. Of course, secondary plug wall panels 1652 and 1652a both have bent end sections 1656 that snap fit within extrusions 32 which are only shown generically.

It will be appreciated that, while only one projection 48 has been shown in each bent end securing wall 44a, 44b, and only one cut-out recess 26 and 58 has been shown in each bent section 18, 56, a plurality of spaced apart projections 48 can be provided in each bent end securing wall 44a, 44b, and a plurality of spaced apart cut-out recesses 26 and 58 can likewise be provided each bent section 18, 56, to provide better securement of the wall panels.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A wall panel construction consisting of:
   an extrusion adapted to be secured to an existing wall, said extrusion including at least one bent end securing wall;
   one of a planter box and a lighting arrangement; and
   a wall panel including:
      a main wall panel, the main wall panel having an outer exposed surface on a first outer side of the main wall panel, the outer exposed surface having a three-dimensional decorative shape in cross-section when connected to the existing wall, the main wall panel being comprised of a plurality of planar main wall panel sections connected at adjacent edges to each other and extending at different angles and orientations relative to each other, and at least one opening in at least one said main wall panel section, with the one of the plantar box and the lighting arrangement positioned entirely below a respective said opening and entirely below the outer exposed surface of the main wall panel to enable viewing of said one of:
the planter box and
the lighting arrangement through the respective said opening; and
at least two bent end sections extending at an angle from different edges of said main wall panel so as to mount the main wall panel in covering relation to the existing wall so that the outer exposed surfaces of all of the main wall panel sections thereof are exposed;
one of:
a recess at a first surface of each bent end section which is adapted to face a second surface of a respective said bent end securing wall for engagement with a projection at the second surface of the respective bent end securing wall; and
a projection at the first surface of each bent end section for engagement with a recess at the second surface of the respective bent end securing wall.

2. A wall panel according to claim 1, wherein each projection and corresponding recess has a cross-sectional shape selected from the following shapes:
a square shape,
a rectangular shape,
a triangular shape,
a triangular shape with a rounded upper surface,
a trapezoidal shape, and
a cylindrical shape.

3. A wall panel according to claim 1, wherein each recess is formed in the first surface of each bent end section, and each projection is formed at the second surface of each bent end securing wall.

4. A wall panel according to claim 1, wherein the main wall panels have a shape selected from the following shapes:
a trapezoidal shape in cross-section;
a rectangular in cross-section;
a mushroom shape in cress-section;
a shape in cross-section defined by outwardly inclined surfaces that meet at a central, upper concave surface;
a roof like shape in cross-section;
a shape in cross-section defined by outwardly inclined surfaces that meet at a central, wave-like surface;
a pyramid shape; and
trapezoidal side walls connected at shorter sides of each trapezoidal side wall to a rectangular center section.

5. A wall panel according to claim 1, wherein each bent end section is removably secured to a respective said bent end securing wall.

6. A wall panel construction consisting of:
one of a planter box and a lighting arrangement; and
a wall panel including a main wall panel, the main wall panel having an outer exposed surface on a first outer side of the main wall panel, the outer exposed surface having a three-dimensional decorative shape in cross-section when connected to an existing wall, the main wall panel being comprised of a plurality of main wall panel sections connected at adjacent edges to each other and extending at different angles and orientations relative to each other, and at least one opening in at least one said main wall panel section, with the one of the plantar box and the lighting arrangement positioned entirely below a respective said opening and entirely below the outer exposed surface of the main wall panel to enable viewing of said one of:
the planter box and
the lighting arrangement
through the respective said opening.

7. A wall panel construction comprising:
one of a planter box and a lighting arrangement; and
a wall panel including a main wall panel, the main wall panel having an outer exposed surface on a first outer side of the main wall panel, the outer exposed surface having a three-dimensional decorative shape in cross-section when connected to an existing wall, the main wall panel being comprised of only four main wall panel sections connected at adjacent edges to each other and extending at different angles and orientations relative to each other, and at least one opening in at least one said main wall panel section, with the one of the plantar box and the lighting arrangement positioned entirely below a respective said opening and entirely below the outer exposed surface of the main wall panel to enable viewing of said one of:
the planter box and
the lighting arrangement
through the respective said opening.

* * * * *